United States Patent
Dowle et al.

(10) Patent No.: US 11,634,167 B1
(45) Date of Patent: Apr. 25, 2023

(54) TRANSMITTING AXIAL AND ROTATIONAL MOVEMENT TO A HUB

(71) Applicants: James J. Dowle, Mountain View, CA (US); Philipp J. Wolf, Santa Clara, CA (US); Dan-Sverker A. Fhyr, Alameda, CA (US); Neal M. Lackritz, Mountain View, CA (US)

(72) Inventors: James J. Dowle, Mountain View, CA (US); Philipp J. Wolf, Santa Clara, CA (US); Dan-Sverker A. Fhyr, Alameda, CA (US); Neal M. Lackritz, Mountain View, CA (US)

(73) Assignee: APPLE INC., Cupertino, CA (US)

( * ) Notice: Subject to any disclaimer, the term of this patent is extended or adjusted under 35 U.S.C. 154(b) by 736 days.

(21) Appl. No.: 16/523,433

(22) Filed: Jul. 26, 2019

Related U.S. Application Data

(60) Provisional application No. 62/731,298, filed on Sep. 14, 2018.

(51) Int. Cl.
*B62D 5/04* (2006.01)
*B60G 17/0195* (2006.01)
*B60G 11/14* (2006.01)

(52) U.S. Cl.
CPC ............ *B62D 5/0403* (2013.01); *B60G 11/14* (2013.01); *B60G 17/0195* (2013.01);
(Continued)

(58) Field of Classification Search
CPC ................ B62D 5/0403; B62D 5/0421; B60G 17/0195; B60G 2200/445; B60G 2500/40
See application file for complete search history.

(56) References Cited

U.S. PATENT DOCUMENTS

| | | |
|---|---|---|
| 2,757,938 A | 8/1956 | Crowder |
| 2,901,239 A | 8/1959 | Sethna |

(Continued)

FOREIGN PATENT DOCUMENTS

| | | |
|---|---|---|
| CN | 108215946 A | 6/2018 |
| CN | 208439009 U | 1/2019 |

(Continued)

OTHER PUBLICATIONS

Wikipedia, "Trailing-arm suspension", https://en.wikipedia.org/wiki/Trailing-arm_suspension, downloaded Sep. 3, 2019 (2 pp).

(Continued)

*Primary Examiner* — Jacob D Knutson
(74) *Attorney, Agent, or Firm* — Young Basile Hanlon & MacFarlane, P.C.

(57) ABSTRACT

In one aspect of the present disclosure, a combined suspension and steering module is disclosed that is positionable between an in-hub motor and a body of a vehicle. The module includes a housing, an actuator connected to the housing and including first and second components, and a steering system that is in mechanical cooperation with the actuator to rotate at least one of the first and second components in relation to the housing. The second component is axially movable in relation to the first component and is configured for connection to the in-hub motor to transmit rotational force from the actuator to the in-hub motor to cause angular displacement of the in-hub motor to thereby steer the vehicle.

20 Claims, 12 Drawing Sheets

(52) U.S. Cl.
CPC ...... *B62D 5/0421* (2013.01); *B60G 2200/445* (2013.01); *B60G 2500/40* (2013.01)

(56) References Cited

U.S. PATENT DOCUMENTS

| | | | |
|---|---|---|---|
| 2,913,252 A | 11/1959 | Norrie | |
| 3,089,710 A | 5/1963 | Fiala | |
| 3,236,334 A | 2/1966 | Wallerstein, Jr. | |
| 3,322,379 A | 5/1967 | Flannelly | |
| 3,368,824 A | 2/1968 | Julien | |
| 3,441,238 A | 4/1969 | Flannelly | |
| 3,741,581 A * | 6/1973 | Patrin | B60G 3/00 |
| | | | 280/93.513 |
| 3,781,032 A | 12/1973 | Jones | |
| 3,970,162 A | 7/1976 | Le Salver et al. | |
| 4,206,935 A | 6/1980 | Sheppard et al. | |
| 4,379,572 A | 4/1983 | Hedenberg | |
| 4,530,514 A | 7/1985 | Ito | |
| 4,537,420 A | 8/1985 | Ito et al. | |
| 4,589,678 A | 5/1986 | Lund | |
| 4,613,152 A | 9/1986 | Booher | |
| 4,614,359 A | 9/1986 | Lundin et al. | |
| 4,634,142 A | 1/1987 | Woods et al. | |
| 4,637,628 A | 1/1987 | Perkins | |
| 4,643,270 A | 2/1987 | Beer | |
| 4,659,106 A | 4/1987 | Fujita et al. | |
| 4,784,378 A | 11/1988 | Ford | |
| 4,834,416 A | 5/1989 | Shimoe et al. | |
| 4,877,098 A * | 10/1989 | Asanuma | B62D 5/0418 |
| | | | 180/444 |
| 4,893,832 A | 1/1990 | Booher | |
| 4,922,159 A | 5/1990 | Phillips et al. | |
| 4,960,290 A | 10/1990 | Bose | |
| 4,981,309 A | 1/1991 | Froeschle et al. | |
| 4,991,698 A | 2/1991 | Hanson | |
| 5,027,048 A | 6/1991 | Masrur et al. | |
| 5,033,028 A | 7/1991 | Browning | |
| 5,060,959 A | 10/1991 | Davis et al. | |
| 5,172,930 A | 12/1992 | Boye et al. | |
| 5,244,053 A | 9/1993 | Kashiwagi | |
| 5,251,926 A | 10/1993 | Aulerich et al. | |
| 5,364,081 A | 11/1994 | Hartl | |
| 5,401,053 A | 3/1995 | Sahm et al. | |
| 5,409,254 A | 4/1995 | Minor et al. | |
| 5,468,055 A | 11/1995 | Simon et al. | |
| 5,507,518 A | 4/1996 | Nakahara et al. | |
| 5,517,414 A | 5/1996 | Hrovat | |
| 5,645,250 A | 7/1997 | Gevers | |
| 5,678,847 A | 10/1997 | Izawa et al. | |
| 5,785,345 A | 7/1998 | Barlas et al. | |
| 5,810,335 A | 9/1998 | Wirtz et al. | |
| 5,829,764 A | 11/1998 | Griffiths | |
| 5,880,542 A | 3/1999 | Leary et al. | |
| 6,032,770 A | 3/2000 | Alcone et al. | |
| 6,113,119 A | 9/2000 | Laurent et al. | |
| 6,142,494 A | 11/2000 | Higuchi | |
| 6,170,838 B1 | 1/2001 | Laurent et al. | |
| 6,233,510 B1 | 5/2001 | Platner et al. | |
| 6,249,728 B1 | 6/2001 | Streiter | |
| 6,276,710 B1 | 8/2001 | Sutton | |
| 6,314,353 B1 | 11/2001 | Ohsaku et al. | |
| 6,357,770 B1 | 3/2002 | Carpiaux et al. | |
| 6,364,078 B1 | 4/2002 | Parison et al. | |
| 6,443,436 B1 | 9/2002 | Schel | |
| 6,470,248 B2 | 10/2002 | Shank et al. | |
| 6,502,837 B1 | 1/2003 | Hamilton et al. | |
| 6,513,819 B1 | 2/2003 | Oliver et al. | |
| 6,634,445 B2 | 10/2003 | Dix et al. | |
| 6,637,561 B1 | 10/2003 | Collins et al. | |
| 6,873,891 B2 | 3/2005 | Moser et al. | |
| 6,926,288 B2 | 8/2005 | Bender | |
| 6,940,248 B2 | 9/2005 | Maresca et al. | |
| 6,945,541 B2 | 9/2005 | Brown | |
| 7,017,690 B2 | 3/2006 | Burke | |
| 7,032,723 B2 | 4/2006 | Quaglia et al. | |
| 7,051,851 B2 | 5/2006 | Svartz et al. | |
| 7,135,794 B2 * | 11/2006 | Kuhnel | B60G 11/16 |
| | | | 74/89.36 |
| 7,140,601 B2 | 11/2006 | Nesbitt et al. | |
| 7,195,250 B2 | 3/2007 | Knox et al. | |
| 7,202,577 B2 | 4/2007 | Parison et al. | |
| 7,302,825 B2 | 12/2007 | Knox | |
| 7,308,351 B2 | 12/2007 | Knoop et al. | |
| 7,315,794 B1 * | 1/2008 | Willis | G01B 11/024 |
| | | | 702/155 |
| 7,392,997 B2 | 7/2008 | Sanville et al. | |
| 7,401,794 B2 | 7/2008 | Laurent et al. | |
| 7,421,954 B2 | 9/2008 | Bose | |
| 7,427,072 B2 | 9/2008 | Brown | |
| 7,484,744 B2 | 2/2009 | Galazin et al. | |
| 7,502,589 B2 | 3/2009 | Howard et al. | |
| 7,543,825 B2 | 6/2009 | Yamada | |
| 7,551,749 B2 | 6/2009 | Rosen et al. | |
| 7,641,010 B2 | 1/2010 | Mizutani et al. | |
| 7,644,938 B2 | 1/2010 | Yamada | |
| 7,654,540 B2 | 2/2010 | Parison et al. | |
| 7,818,109 B2 | 10/2010 | Scully | |
| 7,823,891 B2 | 11/2010 | Bushko et al. | |
| 7,932,684 B2 | 4/2011 | O'Day et al. | |
| 7,962,261 B2 | 6/2011 | Bushko et al. | |
| 7,963,529 B2 | 6/2011 | Oteman et al. | |
| 7,976,038 B2 | 7/2011 | Gregg | |
| 8,047,551 B2 | 11/2011 | Morris et al. | |
| 8,067,863 B2 | 11/2011 | Giovanardi | |
| 8,095,268 B2 | 1/2012 | Parison et al. | |
| 8,099,213 B2 | 1/2012 | Zhang et al. | |
| 8,109,371 B2 | 2/2012 | Kondo et al. | |
| 8,112,198 B2 | 2/2012 | Parison, Jr. et al. | |
| 8,113,522 B2 | 2/2012 | Oteman et al. | |
| 8,127,900 B2 | 3/2012 | Inoue | |
| 8,157,036 B2 | 4/2012 | Yogo et al. | |
| 8,191,874 B2 | 6/2012 | Inoue et al. | |
| 8,282,149 B2 | 10/2012 | Kniffin et al. | |
| 8,336,319 B2 | 12/2012 | Johnston et al. | |
| 8,356,861 B2 | 1/2013 | Kniffin et al. | |
| 8,360,387 B2 | 1/2013 | Breen et al. | |
| 8,370,022 B2 | 2/2013 | Inoue et al. | |
| 8,387,762 B2 | 3/2013 | Kondo et al. | |
| 8,398,091 B2 | 3/2013 | Inoue et al. | |
| 8,417,417 B2 | 4/2013 | Chen et al. | |
| 8,428,305 B2 | 4/2013 | Zhang et al. | |
| 8,466,639 B2 | 6/2013 | Parison, Jr. et al. | |
| 8,490,761 B2 | 7/2013 | Kondo | |
| 8,499,903 B2 | 8/2013 | Sakuta et al. | |
| 8,525,453 B2 | 9/2013 | Ogawa | |
| 8,544,620 B2 | 10/2013 | Inoue et al. | |
| 8,548,678 B2 | 10/2013 | Ummethala et al. | |
| 8,579,311 B2 | 11/2013 | Butlin, Jr. et al. | |
| 8,598,831 B2 | 12/2013 | Ogawa et al. | |
| 8,632,078 B2 | 1/2014 | Ehrlich et al. | |
| 8,641,052 B2 | 2/2014 | Kondo et al. | |
| 8,641,053 B2 | 2/2014 | Pare et al. | |
| 8,668,060 B2 | 3/2014 | Kondo et al. | |
| 8,682,530 B2 | 3/2014 | Nakamura | |
| 8,701,845 B2 | 4/2014 | Kondo | |
| 8,725,351 B1 | 5/2014 | Selden et al. | |
| 8,744,680 B2 | 6/2014 | Rieger et al. | |
| 8,744,694 B2 | 6/2014 | Ystueta | |
| 8,757,309 B2 | 6/2014 | Schmitt et al. | |
| 8,783,430 B2 | 7/2014 | Brown | |
| 8,793,052 B2 | 7/2014 | Inoue et al. | |
| 8,890,461 B2 | 11/2014 | Knox et al. | |
| 8,930,074 B1 | 1/2015 | Lin | |
| 8,938,333 B2 | 1/2015 | Bose et al. | |
| 9,062,983 B2 | 6/2015 | Zych | |
| 9,079,473 B2 | 7/2015 | Lee et al. | |
| 9,102,209 B2 | 8/2015 | Giovanardi et al. | |
| 9,291,300 B2 | 3/2016 | Parker et al. | |
| 9,316,667 B2 | 4/2016 | Ummethala et al. | |
| 9,349,304 B2 | 5/2016 | Sangermano, II et al. | |
| 9,399,384 B2 | 7/2016 | Lee et al. | |
| 9,428,029 B2 | 8/2016 | Job | |
| 9,533,539 B2 | 1/2017 | Eng et al. | |
| 9,550,495 B2 | 1/2017 | Tatourian et al. | |

(56) References Cited

U.S. PATENT DOCUMENTS

| | | |
|---|---|---|
| 9,625,902 B2 | 4/2017 | Knox |
| 9,643,467 B2 | 5/2017 | Selden et al. |
| 9,702,349 B2 | 7/2017 | Anderson et al. |
| 9,855,887 B1 | 1/2018 | Potter et al. |
| 9,868,332 B2 | 1/2018 | Anderson et al. |
| 9,975,391 B2 | 5/2018 | Tseng et al. |
| 10,065,474 B2 | 9/2018 | Trangbaek |
| 10,081,408 B2 | 9/2018 | Yoshida |
| 10,093,145 B1 | 10/2018 | Vaughan et al. |
| 10,245,984 B2 | 4/2019 | Parker et al. |
| 10,300,760 B1 | 5/2019 | Aikin et al. |
| 10,315,481 B2 | 6/2019 | Lu et al. |
| 10,377,371 B2 | 8/2019 | Anderson et al. |
| 10,513,161 B2 | 12/2019 | Anderson et al. |
| 10,906,370 B1 | 2/2021 | Hall et al. |
| 11,124,035 B1 | 9/2021 | Hall et al. |
| 11,173,766 B1 | 11/2021 | Hall et al. |
| 11,345,209 B1 | 5/2022 | Carter et al. |
| 11,358,431 B2 | 6/2022 | Hall et al. |
| 2001/0045719 A1 | 11/2001 | Smith |
| 2002/0190486 A1 | 12/2002 | Phillis et al. |
| 2003/0030241 A1 | 2/2003 | Lawson |
| 2003/0080526 A1 | 5/2003 | Conover |
| 2004/0054455 A1 | 3/2004 | Voight et al. |
| 2004/0074720 A1 | 4/2004 | Thieltges |
| 2004/0094912 A1 | 5/2004 | Niwa et al. |
| 2004/0226788 A1 | 11/2004 | Tanner |
| 2004/0245732 A1 | 12/2004 | Kotulla et al. |
| 2005/0051986 A1 | 3/2005 | Galazin et al. |
| 2005/0096171 A1 | 5/2005 | Brown et al. |
| 2005/0199457 A1 | 9/2005 | Beck |
| 2005/0206231 A1 | 9/2005 | Lu et al. |
| 2005/0211516 A1 | 9/2005 | Kondo et al. |
| 2005/0247496 A1 | 11/2005 | Nagaya |
| 2006/0043804 A1 | 3/2006 | Kondou |
| 2006/0076828 A1 | 4/2006 | Lu et al. |
| 2006/0119064 A1 | 6/2006 | Mizuno et al. |
| 2006/0181034 A1 | 8/2006 | Wilde et al. |
| 2006/0266599 A1 | 11/2006 | Denys et al. |
| 2006/0273530 A1 | 12/2006 | Zuber |
| 2007/0069496 A1 | 3/2007 | Rinehart et al. |
| 2007/0107959 A1 | 5/2007 | Suzuki et al. |
| 2007/0114706 A1 | 5/2007 | Myers |
| 2007/0199750 A1 | 8/2007 | Suzuki et al. |
| 2007/0210539 A1 | 9/2007 | Hakui et al. |
| 2008/0017462 A1 | 1/2008 | Mizutani et al. |
| 2008/0100020 A1 | 5/2008 | Gashi et al. |
| 2008/0111334 A1 | 5/2008 | Inoue et al. |
| 2008/0164111 A1 | 7/2008 | Inoue et al. |
| 2008/0185807 A1 | 8/2008 | Takenaka |
| 2008/0283315 A1 | 11/2008 | Suzuki et al. |
| 2009/0033055 A1 | 2/2009 | Morris et al. |
| 2009/0064808 A1 | 3/2009 | Parison et al. |
| 2009/0095584 A1 | 4/2009 | Kondo et al. |
| 2009/0120745 A1 | 5/2009 | Kondo et al. |
| 2009/0121398 A1 | 5/2009 | Inoue |
| 2009/0173585 A1 | 7/2009 | Kappagantu |
| 2009/0174158 A1 | 7/2009 | Anderson et al. |
| 2009/0198419 A1 | 8/2009 | Clark |
| 2009/0218867 A1 | 9/2009 | Clark |
| 2009/0223322 A1* | 9/2009 | Kossira ............... B62D 5/0418 280/5.52 |
| 2009/0243402 A1 | 10/2009 | O'Day et al. |
| 2009/0243598 A1 | 10/2009 | O'Day |
| 2009/0273147 A1* | 11/2009 | Inoue ..................... F16F 15/03 280/5.505 |
| 2009/0286910 A1 | 11/2009 | Bloomfield |
| 2009/0302559 A1 | 12/2009 | Doerfel |
| 2009/0321201 A1 | 12/2009 | Sakuta et al. |
| 2010/0044977 A1 | 2/2010 | Hughes et al. |
| 2010/0059944 A1 | 3/2010 | Oteman et al. |
| 2010/0059959 A1 | 3/2010 | Kim |
| 2010/0200343 A1 | 8/2010 | Kondo et al. |
| 2010/0207344 A1 | 8/2010 | Nakamura |
| 2010/0222960 A1 | 9/2010 | Oida et al. |
| 2010/0230876 A1 | 9/2010 | Inoue et al. |
| 2010/0252376 A1 | 10/2010 | Chern et al. |
| 2010/0253019 A1 | 10/2010 | Ogawa |
| 2011/0025000 A1 | 2/2011 | Inoue et al. |
| 2011/0115183 A1 | 5/2011 | Alesso et al. |
| 2011/0298399 A1 | 12/2011 | Ogawa et al. |
| 2012/0013277 A1 | 1/2012 | Ogawa |
| 2012/0059547 A1 | 3/2012 | Chen et al. |
| 2012/0109483 A1 | 5/2012 | O'Dea et al. |
| 2012/0153718 A1 | 6/2012 | Rawlinson et al. |
| 2012/0181757 A1 | 7/2012 | Oteman et al. |
| 2012/0187640 A1 | 7/2012 | Kondo et al. |
| 2012/0193847 A1 | 8/2012 | Muragishi et al. |
| 2012/0305348 A1 | 12/2012 | Katayama et al. |
| 2012/0306170 A1 | 12/2012 | Serbu et al. |
| 2013/0060422 A1 | 3/2013 | Ogawa et al. |
| 2013/0060423 A1 | 3/2013 | Jolly |
| 2013/0106074 A1 | 5/2013 | Koku et al. |
| 2013/0221625 A1 | 8/2013 | Pare et al. |
| 2013/0229074 A1 | 9/2013 | Haferman et al. |
| 2013/0233632 A1 | 9/2013 | Kim et al. |
| 2013/0249464 A1 | 9/2013 | Knox et al. |
| 2013/0253764 A1 | 9/2013 | Kikuchi et al. |
| 2013/0341143 A1 | 12/2013 | Brown |
| 2014/0005888 A1 | 1/2014 | Bose et al. |
| 2014/0145498 A1 | 5/2014 | Yamakado et al. |
| 2014/0156143 A1 | 6/2014 | Evangelou et al. |
| 2014/0260233 A1 | 9/2014 | Giovanardi et al. |
| 2014/0312580 A1 | 10/2014 | Gale |
| 2014/0326430 A1 | 11/2014 | Carpenter et al. |
| 2014/0358378 A1 | 12/2014 | Howard et al. |
| 2015/0102569 A1* | 4/2015 | Slawson ................. B60G 3/01 280/5.514 |
| 2015/0123370 A1 | 5/2015 | Lee et al. |
| 2015/0197130 A1 | 7/2015 | Smith et al. |
| 2015/0224845 A1 | 8/2015 | Anderson et al. |
| 2015/0231942 A1 | 8/2015 | Trangbaek et al. |
| 2015/0343876 A1 | 12/2015 | Yoshizawa et al. |
| 2015/0360532 A1 | 12/2015 | Kim |
| 2016/0059658 A1 | 3/2016 | Kuriki |
| 2016/0096458 A1 | 4/2016 | Parker et al. |
| 2016/0159187 A1 | 6/2016 | Mohamed |
| 2016/0167743 A1 | 6/2016 | Melcher |
| 2016/0200164 A1 | 7/2016 | Tabata et al. |
| 2016/0291574 A1 | 10/2016 | Parison |
| 2016/0339823 A1 | 11/2016 | Smith et al. |
| 2016/0347143 A1 | 12/2016 | Hrovat et al. |
| 2017/0047823 A1 | 2/2017 | Sangermano, III et al. |
| 2017/0100980 A1 | 4/2017 | Tsuda |
| 2017/0129367 A1 | 5/2017 | Hein |
| 2017/0129371 A1 | 5/2017 | Knox |
| 2017/0129372 A1 | 5/2017 | Hein et al. |
| 2017/0129373 A1 | 5/2017 | Knox et al. |
| 2017/0137023 A1 | 5/2017 | Anderson et al. |
| 2017/0144501 A1 | 5/2017 | Wall |
| 2017/0203673 A1 | 7/2017 | Parker et al. |
| 2017/0240018 A1 | 8/2017 | Mettrick et al. |
| 2017/0241504 A1 | 8/2017 | Delorenzis et al. |
| 2017/0253101 A1 | 9/2017 | Kuriki |
| 2017/0253155 A1 | 9/2017 | Knox et al. |
| 2018/0015801 A1 | 1/2018 | Mohamed et al. |
| 2018/0022178 A1 | 1/2018 | Xi |
| 2018/0029585 A1 | 2/2018 | Tanimoto |
| 2018/0056748 A1 | 3/2018 | Grimes |
| 2018/0065438 A1 | 3/2018 | Ogawa et al. |
| 2018/0079272 A1 | 3/2018 | Aikin |
| 2018/0089901 A1 | 3/2018 | Rober et al. |
| 2018/0093707 A1* | 4/2018 | Tokioka .............. B62D 5/0418 |
| 2018/0105082 A1 | 4/2018 | Knox |
| 2018/0126816 A1 | 5/2018 | Kondo et al. |
| 2018/0134111 A1* | 5/2018 | Toyohira ............. B60G 17/021 |
| 2018/0162186 A1 | 6/2018 | Anderson et al. |
| 2018/0162187 A1 | 6/2018 | Trangbaek |
| 2018/0195570 A1 | 7/2018 | Churchill et al. |
| 2018/0208009 A1 | 7/2018 | McGuire et al. |
| 2018/0222274 A1 | 8/2018 | Davis et al. |
| 2018/0297587 A1 | 10/2018 | Kasaiezadeh Mahabadi et al. |
| 2018/0345747 A1 | 12/2018 | Boon et al. |
| 2018/0370314 A1 | 12/2018 | Higle |

(56) References Cited

U.S. PATENT DOCUMENTS

| | | |
|---|---|---|
| 2019/0023094 A1 | 1/2019 | Panagis et al. |
| 2019/0118604 A1 | 4/2019 | Suplin et al. |
| 2019/0248203 A1 | 8/2019 | Krehmer et al. |
| 2019/0308484 A1 | 10/2019 | Belter et al. |
| 2020/0088214 A1 | 3/2020 | Woodard et al. |
| 2020/0171907 A1 | 6/2020 | Hall et al. |
| 2020/0180386 A1 | 6/2020 | Tabata et al. |
| 2020/0216128 A1 | 7/2020 | Doerksen |
| 2021/0061046 A1 | 3/2021 | Simon et al. |

FOREIGN PATENT DOCUMENTS

| | | | |
|---|---|---|---|
| DE | 19853876 A1 | 5/2000 | |
| DE | 19850169 C1 | 7/2000 | |
| DE | 102009060213 A1 | 6/2011 | |
| DE | 102010041404 A1 | 3/2012 | |
| DE | 202012002846 U1 | 7/2012 | |
| DE | 102015003530 A1 | 9/2016 | |
| DE | 102016000686 A1 | 7/2017 | |
| DE | 102017106810 A1 * | 10/2018 | ........... B60G 15/068 |
| DE | 102018208774 A1 | 12/2019 | |
| EP | 1693233 B1 | 4/2009 | |
| EP | 2072855 A1 | 6/2009 | |
| EP | 2233330 B1 | 2/2013 | |
| EP | 3088230 A1 | 11/2016 | |
| GB | 2220625 A | 1/1990 | |
| GB | 2437633 A | 10/2007 | |
| JP | 2004155258 A | 6/2004 | |
| JP | 2006200734 A | 8/2006 | |
| JP | 2006327295 A | 12/2006 | |
| JP | 2010-091030 A | 4/2010 | |
| JP | 2012002300 A | 1/2012 | |
| JP | 2012167757 A | 9/2012 | |
| JP | 2013244841 A | 12/2013 | |
| JP | 5796315 B2 | 10/2015 | |
| KR | 101509600 B1 | 4/2015 | |
| KR | 20170095073 A | 8/2017 | |
| WO | 9304883 A1 | 3/1993 | |
| WO | 2011148792 A1 | 12/2011 | |
| WO | 2012028228 A2 | 3/2012 | |
| WO | 2014004118 A1 | 1/2014 | |
| WO | 2014004119 A1 | 1/2014 | |
| WO | 2014094934 A1 | 6/2014 | |
| WO | 2015153811 A1 | 10/2015 | |
| WO | 2015169530 A1 | 11/2015 | |
| WO | 2016120044 A1 | 8/2016 | |
| WO | 2017055151 A1 | 4/2017 | |

OTHER PUBLICATIONS

Cosford, J., "Is it a fair fight? Hydraulics vs. electrics", https://www.mobilehydraulictips.com/fair-fight-hydraulics-vs-electrics/, Mar. 28, 2014 (10 pp).

Monroe Intelligent Suspension, "CVSA2/KINETIC: Low Energy for High Performance", www.monroeintelligentsuspension.com/products/cvsa2-kinetic/, Date Unknown, Downloaded Mar. 2, 2017, 2 pp.

Tenneco, "Integrated Kinetic, H2 CES System, Ride Control Innovation, Accelerated", Rev. Sep. 2011, 4 pp.

porsche.com, "Porsche AG: Porsche 918 RSR—Racing Laboratory With Even Higher-Performance Hybrid Drive—Porsche USA", Current Press Releases dated Jan. 10, 2011, Downloaded Mar. 13, 2017, www.porsche.com/usa/aboutporsche/pressreleases/pag/?pool=international-de&id-2011-01-10, 6 pp.

autoblog.com, "Porsche (finally) Unleashes Full, Official Details in 918 Spyder—Autoblog", Sep. 9, 2013, www.autoblog.com/2013/09/09/porsche-official-detials-918-spyder-frankfurt/, Downloaded Mar. 13, 2017, 26 pp.

press.porsche.com, "Introducing the Porsche 918 Spyder", Date Unknown, http://press.porsche.com/news/release.php?id-787, Downloaded Mar. 13, 2017, 7 pp.

Edren, Johannes, "Motion Modelling and Control Strategies of Over-Actuated Vehicles", Doctoral Thesis, Stockholm 2014 (56 pp).

Bolognesi, P., et al., "FEM Modeling and Analysis of a Novel Rotary-Linear Isotropic Brushless Machine", XIX International Conference of Electrical Machines—ICEM 2010, Rome (6 pp).

Xu, Lei, et al., "Design and Analysis of a Double-Stator Linear-Rotary Permanent-Magnet Motor", IEEE Transactions on Applied Superconductivity, vol. 26, No. 4, Jun. 2016, (4 pp).

SAE International, "Michelin re-invents the wheel", Oct. 14, 2008, Downloaded Sep. 7, 2017, http://articles.sae.org/4604/ (2 pp).

daimler.com, "Suspension: The world's first suspension system with 'eyes'", https://media.daimler.com/marsMediaSite/en/instance/ko/Suspension-The-worlds-first-suspension-system-with-eyes.xhtml?oid=9904306, May 15, 2013 (6 pp).

youtube.com., KSSofficial, "Miniature Ball Screw With Ball Spline / English", Published on May 10, 2013, https://www.youtube.com/watch?v=vkcxmM0iC8U (2 pp).

Nippon Bearing, "Ball Screw Spline SPBR/SPBF", Product Description, Date Unknown, Downloaded Jun. 28, 2019, https://www.nbcorporation.com/shop/ball-spline/spbr-spbf/ (2 pp).

* cited by examiner

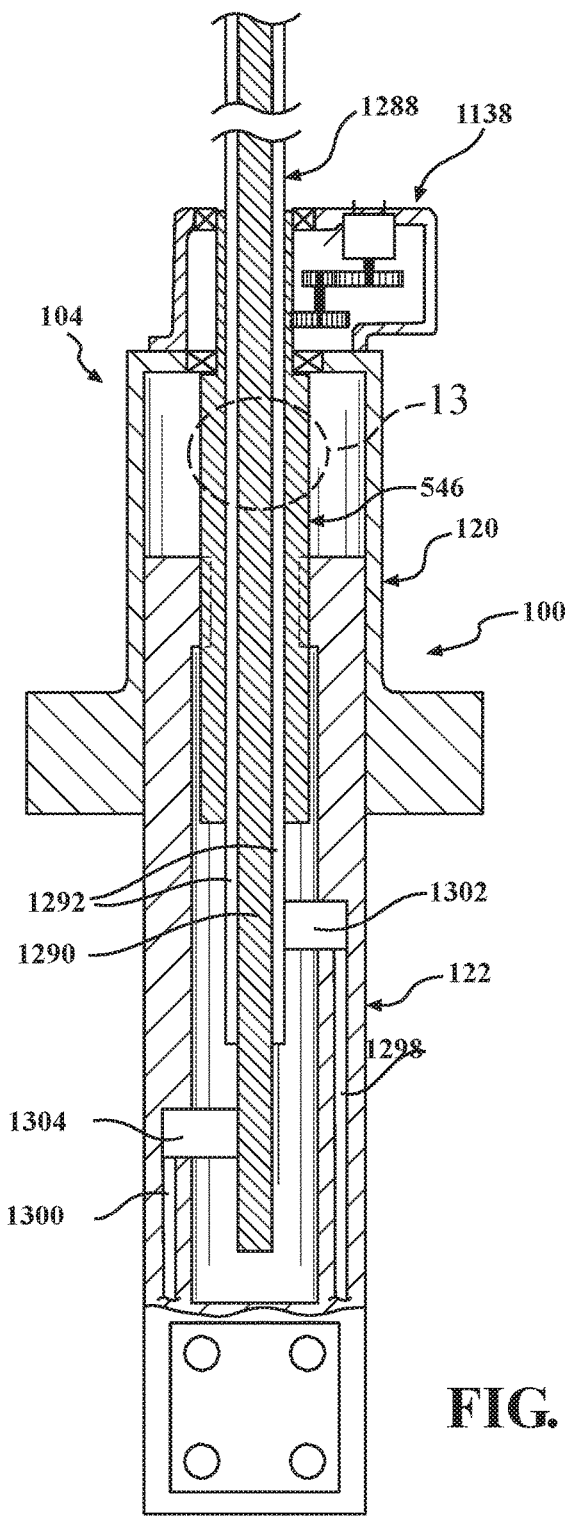
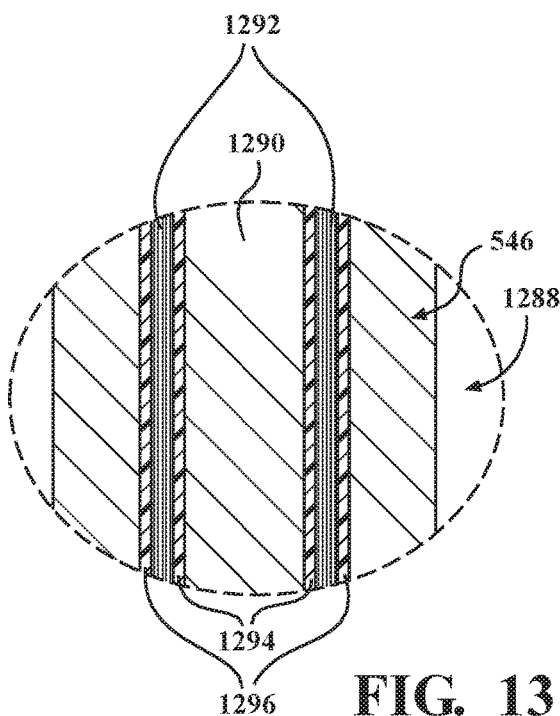
FIG. 12
FIG. 13

TRANSMITTING AXIAL AND ROTATIONAL MOVEMENT TO A HUB

CROSS-REFERENCE TO RELATED APPLICATIONS

This application claims the benefit of U.S. Provisional Application No. 62/731,298 filed on Sep. 14, 2018, the contents of which is hereby incorporated by reference in its entirety for all purposes.

FIELD

The present disclosure relates generally to vehicle suspension and steering systems, and more specifically, to a combined suspension and steering module.

BACKGROUND

Conventional vehicles employ a multitude of operational and structural systems to create propulsion and support, including, for example, an engine or a main electrical motor, a transmission, one or more drive shafts, and a power train. The chassis, subframes, link arms, and other supporting structures required to envelop and support these systems can be complex, heavy, and costly, and often create inefficiencies and obstacles with regard to design, integration, packaging, and/or safety. For example, in known suspension and drivetrain systems, the suspension links, driveshafts, and transmissions are often routed through or beneath major crash structures of the vehicle, which can compromise load paths for crash forces.

The integration, elimination, and/or relocation of one or more systems would result in the liberation of space that may be otherwise utilized. For example, the additional space created may allow for an increase in interior volume, thereby increasing the comfort of vehicle occupants, as well as the incorporation of additional or more robust crash structures, and may create additional options for the packaging of other components of the vehicle. The elimination of certain systems, such as drivetrains, transmissions, and subframes, for example, may also simplify vehicle design, reduce the overall weight of the vehicle, and reduce cost.

The modular unit described herein provides both suspension and steering functionality and can be integrated into existing vehicular platforms to simplify design and replace one or more known systems to address these deficiencies and capitalize on the resultant opportunities.

SUMMARY

In one aspect of the present disclosure, a combined suspension and steering module is disclosed that is positionable between an in-hub motor and a body of a vehicle. The module includes a housing, an actuator connected to the housing and including first and second components, and a steering system that is in mechanical cooperation with the actuator to rotate at least one of the first and second components in relation to the housing. The second component is axially movable in relation to the first component and is configured for connection to the in-hub motor to transmit rotational force from the actuator to the in-hub motor to cause angular displacement of the in-hub motor to thereby steer the vehicle.

In certain embodiments, the actuator may include a suspension member positioned between the first and second components to absorb axial force applied to actuator.

In certain embodiments, the steering system may include a motor, a motor shaft connected to the motor, a first gear connected to the motor shaft, and a second gear connected to the second component of the actuator. In such embodiments, the second gear may be engageable with the first gear such that rotation of the motor shaft causes corresponding rotation of the first and second gears.

In certain embodiments, the first and second gears may be positioned either externally of the actuator or internally within the actuator.

In certain embodiments, the second gear may be positioned about the first gear such that the second gear at least partially circumscribes the first gear.

In another aspect of the present disclosure, a combined suspension and steering module is disclosed for use with a vehicle including an in-hub motor. The module includes a steering system and an actuator in mechanical cooperation with the steering system. The actuator includes a first component and a second component operatively connected to the first component such that at least one of the first and second components is rotatable by the steering system. The second component is axially movable in relation to the first component whereby the actuator is repositionable between a first position, in which the actuator defines a first overall length, and a second position, in which the actuator defines a second overall length less than the first overall length.

In certain embodiments, the first component may define an internal chamber configured to receive the second component such that the second component is axially movable within the chamber.

In certain embodiments, the actuator may further include a suspension member positioned within the internal chamber to absorb axial force applied to actuator.

In certain embodiments, the actuator may be biased towards the first position by the suspension member.

In certain embodiments, the actuator may include an interface that is configured for connection to the in-hub motor to transmit rotational force to the in-hub motor.

In certain embodiments, the steering system may be in mechanical cooperation with the first component of the actuator to cause rotation of the first component. In such embodiments, the second component may include the interface and may be connected to the first component such that the second component is rotatable in unison with the first component.

In certain embodiments, the steering system may be in mechanical cooperation with the second component of the actuator such that the second component is rotatable in relation to the first component. In such embodiments, the interface may be connected to the second component.

In certain embodiments, the steering system may include a motor, a first gear operatively connected to the motor, and a second gear connected to the second component. In such embodiments, the second gear may be engageable with the first gear such that rotation of the first gear causes corresponding rotation of the second gear and the second component.

In certain embodiments, the first and second gears may be positioned either externally of the actuator or internally within the actuator.

In another aspect of the present disclosure, a combined suspension and steering module is disclosed for use with a vehicle. The module includes a housing that is connectable to a body of the vehicle, an actuator secured to the housing and including inner and outer components, and a steering system in mechanical cooperation with the actuator to cause rotation of the inner component. The inner component of the actuator is operatively connected to the outer component such that the inner component is axially movable in relation to the outer component. The inner component includes an interface that is connectable to an in-hub motor of the vehicle to transmit rotation of the inner component to the in-hub motor.

The steering system includes a motor, a motor shaft connected to the motor, a first gear connected to the motor shaft, and a second gear connected to the inner component. The second gear is engageable with the first gear such that rotation of the motor shaft causes corresponding rotation of the first and second gears to thereby rotate the inner component of the actuator and cause angular displacement of the in-hub motor to steer the vehicle.

In certain embodiments, axial movement of the inner component in relation to the outer component may reposition the actuator between a first position, wherein the actuator defines a first overall length, and a second position, wherein the actuator defines a second overall length less than the first overall length.

In certain embodiments, the actuator may further include a suspension member positioned between the inner and outer components to absorb axial force applied to actuator.

In certain embodiments, the first and second gears may be positioned internally within the actuator.

In another aspect of the present disclosure, a combined suspension and steering module is disclosed that is configured for connection to a vehicle wheel. The module includes an actuator defining a longitudinal axis, a first drive assembly, and a second drive assembly. The actuator includes a first component; a drive screw that is rotatable within the first component and axially movable within the first component along the longitudinal axis; and a second component that is fixedly connected to the drive screw such that axial and rotational movement of the drive screw causes corresponding axial and rotational movement of the second component. The second component is configured for connection to the wheel of the vehicle to transmit rotational force from the second component to the wheel to cause angular displacement of the wheel and thereby steer the vehicle. The first drive assembly and the second drive assembly respectively include a ball screw nut and a ball spline nut that are configured for engagement with the drive screw.

In certain embodiments, the drive screw may include a helical thread and axial grooves.

In certain embodiments, the ball screw nut may be secured to the first component of the actuator and may include ball bearings that are configured for positioning within the helical thread such that relative rotation between the ball screw nut and the drive screw (e.g., via rotation of the ball screw nut relative to the drive screw, or rotation of the drive screw relative to the ball screw nut) causes axial movement of the drive screw along the longitudinal axis.

In certain embodiments, the ball spline nut may be secured to the first component of the actuator and may include ball bearings that are configured for positioning within the axial grooves such that rotation of the ball spline nut causes corresponding rotation of the drive screw. In certain embodiments, the first drive assembly and the second drive assembly may be configured such that: (i) rotating the ball screw nut and the ball spline nut at equivalent speeds causes rotational movement of the drive screw without axial movement of the drive screw; (ii) rotating the ball screw nut while maintaining the rotational position of the ball spline nut causes axial movement of the drive screw without rotational movement of the drive screw; and (iii) rotating the ball spline nut while maintaining the rotational position of the ball screw nut causes both axial and rotational movement of the drive screw.

BRIEF DESCRIPTION OF THE DRAWINGS

FIG. 12 is a longitudinal, partial cross-sectional view of the module seen in FIG. 1 together with the embodiment of the steering system seen in FIG. 11 and a power supply system.

FIG. 13 is an enlargement of the area of detail indicated in FIG. 12.

DETAILED DESCRIPTION

The present disclosure describes suspension and steering modules that are connectable to the in-wheel hub motors of either autonomous or piloted vehicles. Each module includes an actuator having a first component that is connectable to the body of the vehicle and a motor-driven second component that is connectable to one of the in-wheel hub motors. The second components are rotatable in relation to the first components to provide steering functionality to the corresponding wheels of the vehicle. In addition, the second components are axially movable in relation to the first components to absorb forces applied to the wheel of the vehicle during operation, for example, via encounters with surface irregularities or obstacles in the road, and thereby provide suspension functionality. By combining suspension and steering functions into a single module, various components can be eliminated from traditional vehicular design to create additional interior and exterior space that allows for more robust and efficient crash structures, the storage of larger or additional power supplies, and greater flexibility in the packaging of other components of the vehicle.

Figure 1:
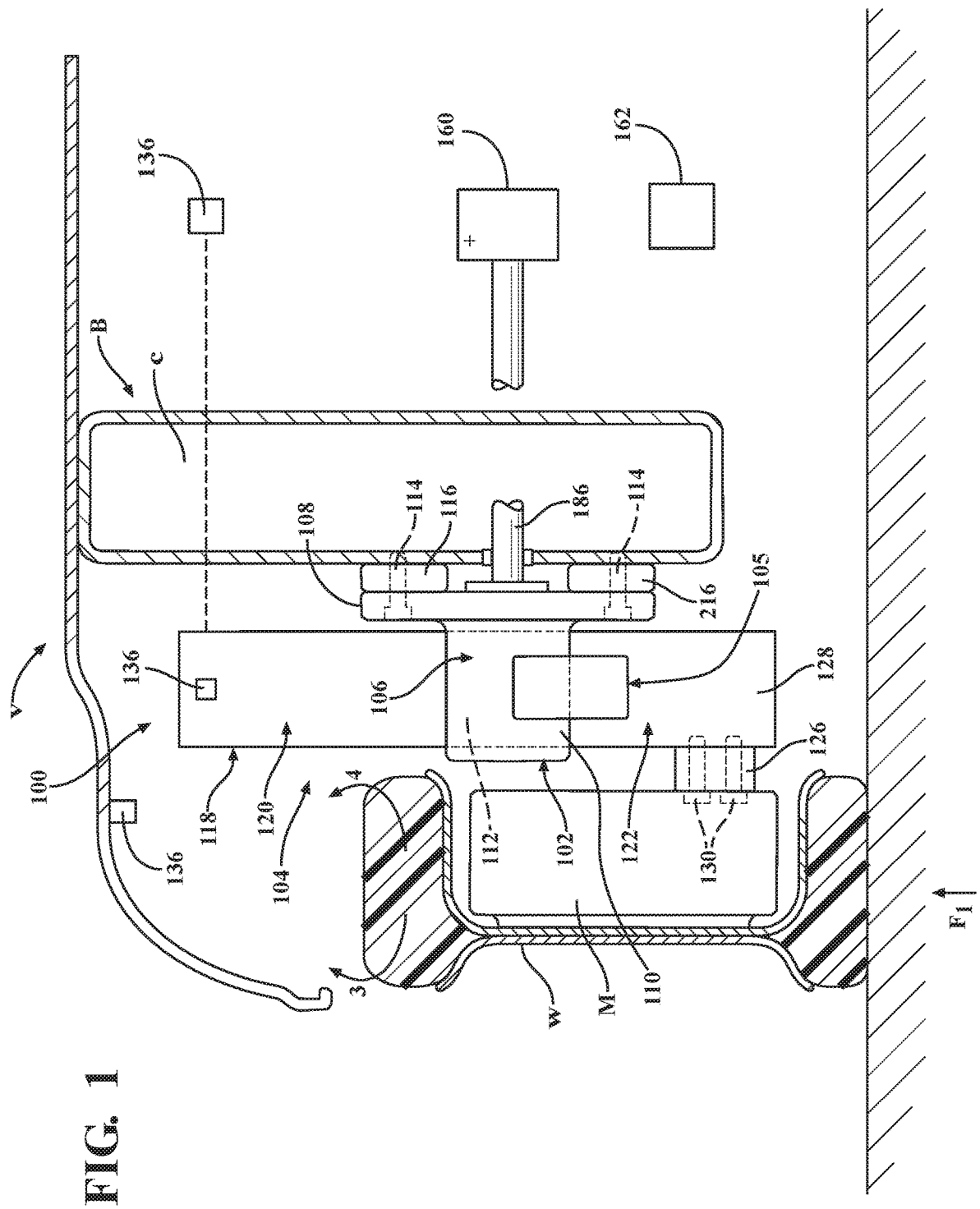
FIG. 1 is a partial, cross-sectional view of a vehicle including a combined suspension and steering module including an actuator including a first component and a second component according to one embodiment of the present disclosure.
Figure 2:
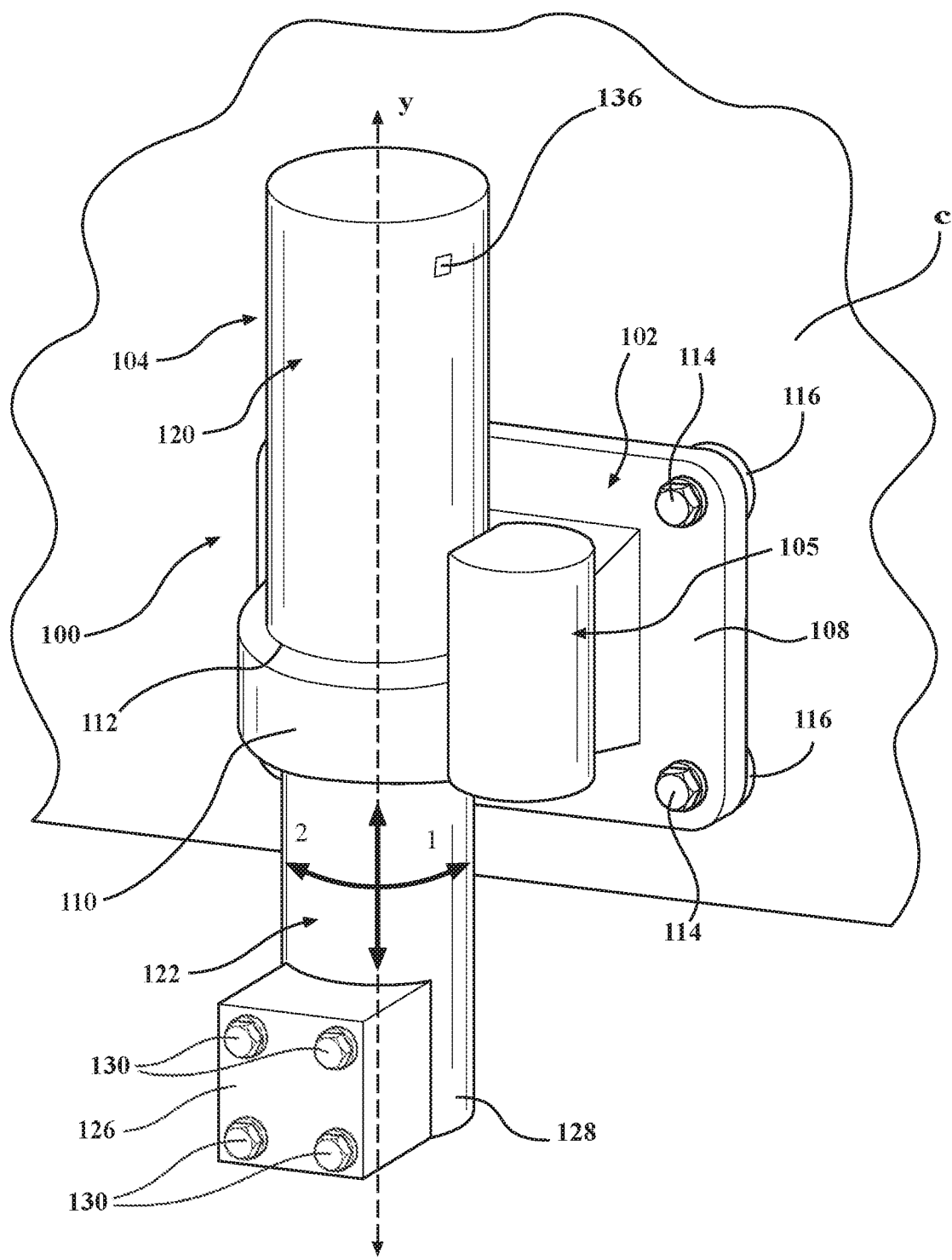
FIG. 2 is a side, perspective view of the module seen in FIG. 1.
Figure 3:
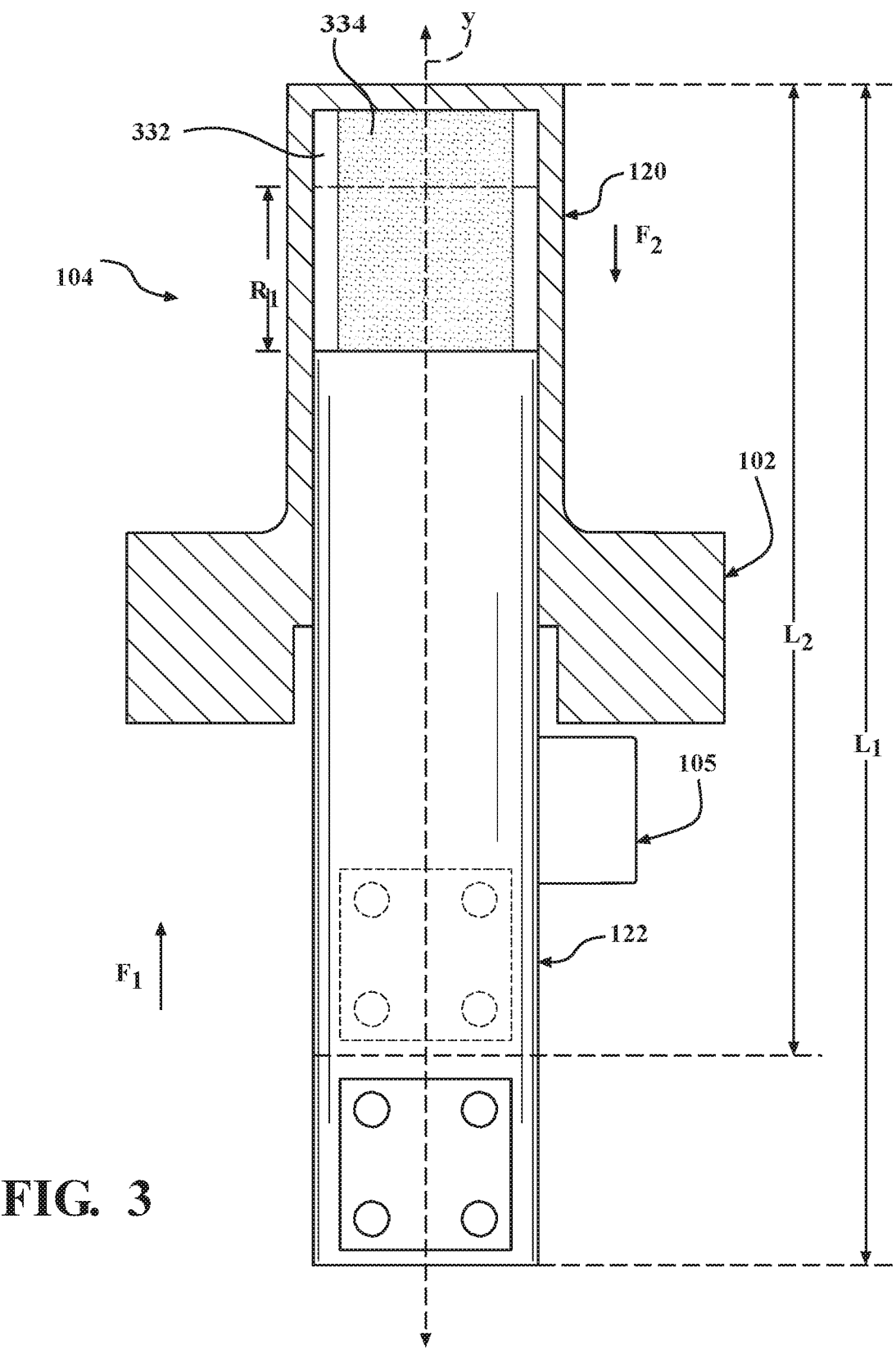
FIG. 3 is a longitudinal, partial cross-sectional view of the first component seen in FIG. 1 shown with the second component.

FIGS. 1-3 illustrate a combined suspension and steering module 100 for use with a vehicle V having a series of wheels W that are driven by corresponding in-hub motors M. For simplicity, the module 100 is shown in connection with a single wheel W and in-hub motor M in FIGS. 1 and 2; however, it should be understood that identical modules 100 can be utilized in connection with each of the vehicle's wheels W and in-hub motors M, regardless of their number or location. In addition, it is envisioned that the module 100 may be standardized to facilitate use with any make, model, or style of vehicle V. As discussed in detail below, each module 100 provides both suspension and steering functionality, and includes a housing 102, an actuator 104, and a steering system 105 that allows for angular displacement of the wheel W via the application of a rotational force to the actuator 104.

The housing 102 allows for connection of the module 100 to the vehicle V and includes a body portion 106 configured to receive the actuator 104, and a backing plate 108. In the particular embodiment illustrated in FIGS. 1-3, the body portion 106 is configured as a yoke 110 defining a receiving space 112 that is configured to accommodate the actuator 104. To facilitate receipt of the actuator 104, the yoke 110 may be configured in correspondence with the actuator 104. For example, as seen in FIGS. 1 and 2, the receiving space 112 may define an arcuate inner contour corresponding to an outer contour defined by the actuator 104.

The backing plate 108 is configured for attachment to a body B of the vehicle V in any suitable location. For example, the backing plate 108 may be connected to a crash structure C of the vehicle V, as shown in FIGS. 1 and 2, or to the vehicle chassis (not shown). The backing plate 108 may be secured to the body B of the vehicle V in any suitable manner, such as, for example, through the use of one or more fasteners 114 and bushes 116, which may be tuned in accordance with the required compliance for the vehicle V, for example, to facilitate an acceptable amount of lateral displacement.

In one embodiment of the disclosure, it is envisioned that that body portion 106 and the backing plate 108 may be integrally or monolithically formed so as to define a unitary structure, as shown in FIGS. 1-3. Alternatively, the housing 102 and the backing plate 108 may be formed separately and connected via welding or any other suitable method of attachment.

With continued reference to FIGS. 1-3, the actuator 104 includes a cylindrical body 118 having a first (outer) component 120 and a second (inner) component 122 that is movable in relation to the first component 120. More specifically, in the illustrated embodiment, the first component 120 and the second component 122 are operatively connected so as to permit axial and rotational movement of the second component 122 in relation to the first component 120. In particular, the actuator 104 is configured such that the second component 122 is axially movable in relation to the first component 120 along a longitudinal axis Y (FIG. 2) of the actuator 104, as well as rotatable in relation to the first component 120 in the directions indicated by arrows 1, 2 via the steering system 105 (FIGS. 1, 2).

Figure 4:
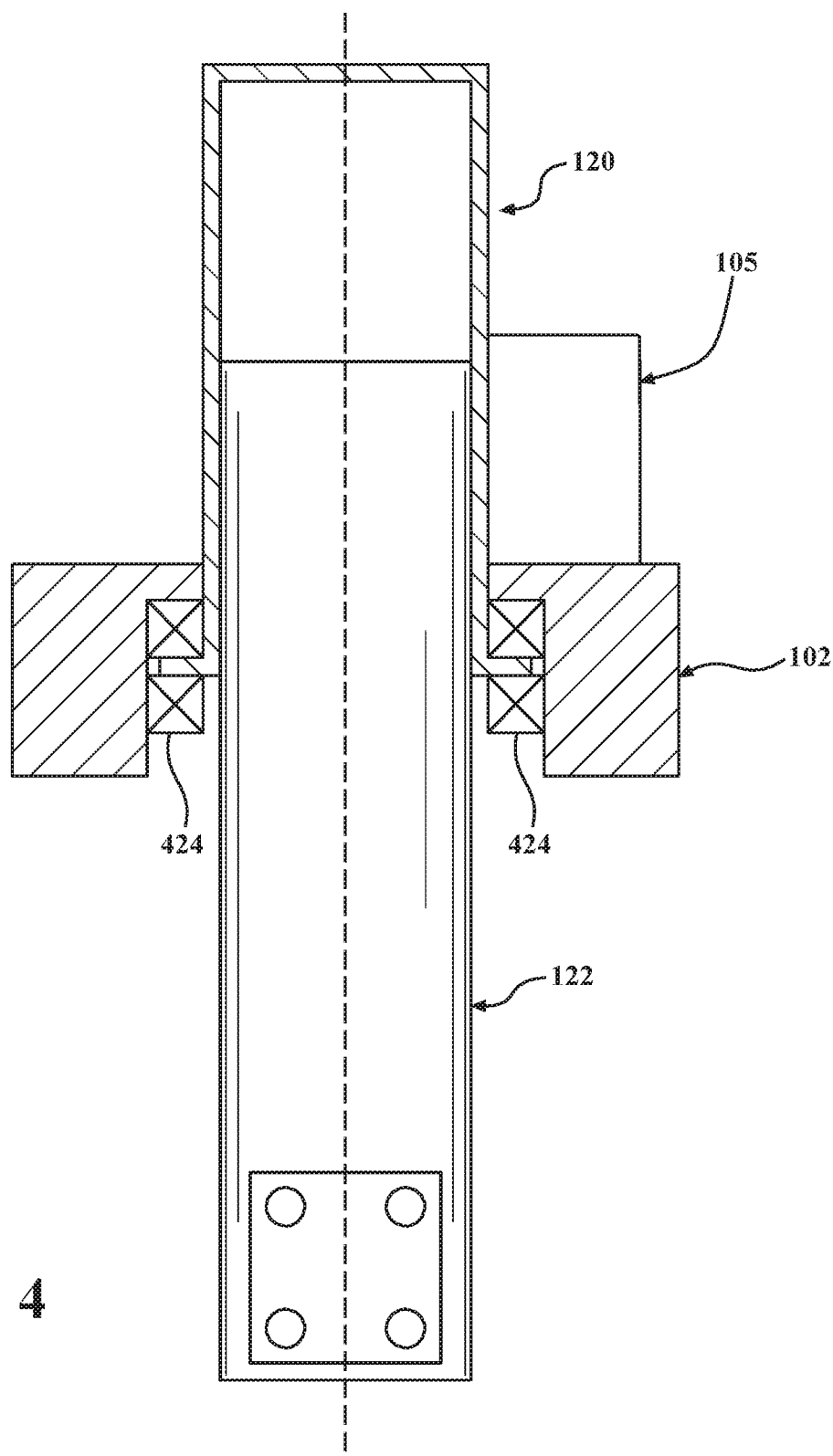
FIG. 4 is a longitudinal, partial cross-sectional view of an alternate embodiment of the first component seen in FIG. 1 shown with the second component.

In the embodiment shown in FIGS. 1-3, the first component 120 is connected to the housing 102 to restrain axial and rotational movement of the first component 120 in relation to the housing 102 so as to facilitate the transmission of force between the body B of the vehicle V and the module 100. The first component 120 may be connected to the housing 102 in any suitable manner. For example, it is envisioned that the housing 102 and the first component 120 may be integrally or monolithically formed so as to define a unitary structure, as shown in FIG. 3. Alternatively, as shown in FIG. 4, it is envisioned that the housing 102 and the first component 120 may be formed separately and mechanically connected such that the entire actuator 104 (i.e., both the respective first and second components 120, 122) is rotatable in relation to the housing 102 via the steering mechanism 105 (FIGS. 1, 2). To facilitate rotation of the actuator 104 in relation to the housing 102, it is envisioned that the module 100 may include bearings 424, or any other suitable structure or mechanism. In such embodiments, the respective first and second components 120, 122 may include corresponding structures that are configured to allow the components 120, 122 to rotate in unison while permitting relative axial movement between the components 120, 122, such as, for example, splines or a key and keyway arrangement.

With reference now to FIGS. 1-3 and 5, an interface 126 is secured to a lower portion 128 of the second component 122. The interface 126 establishes a mechanical connection between the actuator 104 and the in-hub motor M (FIG. 1) such that axial and rotational forces are transferrable between the actuator 104 and the wheel W via the in-hub motor M and the interface 126. The interface 126 may be connected to the actuator 104 in any suitable manner. For example, as seen in FIG. 2, the lower portion 128 of the second component 122 and the interface 126 may be formed as separate, discrete structures that are mechanically connected, such as through the use of fasteners 130, via welding, or any other suitable method of attachment. Alternatively, it is envisioned that the lower portion 128 of the actuator 104 and the interface 126 may be integrally or monolithically formed so as to define a unitary structure.

As seen in FIG. 3, the first component 120 includes a chamber 332 that receives the second component 122 such that the second component 122 extends axially from the first component 120. The chamber 332 is configured to allow for axial and rotational movement of the second component 122 in relation to the first component 120 in the manner described herein.

Upon the application of force $F_1$ to the actuator 104, for example, via encounter with a surface irregularity or an obstacle in the road, the actuator 104 is compressed and moves from a first position, wherein the actuator 104 defines an overall length $L_1$ (FIG. 3), to a second position, wherein the actuator 104 defines a reduced overall length $L_2$. The first component 120 and the second component 122 may be configured and connected to facilitate any desirable range of axial motion $R_1$ along the longitudinal axis Y. By altering the dimensions of the first component 120, the second component 122, and the chamber 332, the range of axial motion $R_1$ can be varied to permit increased or decreased travel along the longitudinal axis Y.

To facilitate absorption of the force $F_1$, the actuator 104 may further include a suspension member 334 (FIG. 3). Although illustrated as being positioned within the chamber 332 between the respective first and second components 120, 122 of the actuator 104, the suspension member 334 may be positioned in any suitable location. For example, in alternate embodiments, a coil-over system may be employed in which the suspension member 334 is positioned externally about the actuator 104 such that the suspension member 334 circumscribes the actuator 104.

The suspension member 334 may be any member, structure, or component suitable for the intended purpose of absorbing and dissipating the forces $F_1$ (FIGS. 1, 3) applied to the actuator 104 during use of the vehicle V. For example, the suspension member 334 may include one or more passive members, such as springs or coils, for example, to bias the actuator 104 towards the first (uncompressed) position. In such embodiments, the suspension member 334 may further include one or more dampers (or other such structure) to suppress vibration transmission and influence operation of the suspension member 334. Additionally, or alternatively, the suspension member 334 may include a hydraulic or pneumatic system, one or more motors or actuators, or any other suitable structure(s) or mechanism(s) allowing for active functionality.

As seen in FIG. 1, the vehicle V may include one or more sensors 136 positioned in any suitable location, for example, on the body B of the vehicle V or on the module 100, to receive and interpret data regarding, for example, the condition of the road surface, the presence of obstacles, etc. In active embodiments of the module 100, the sensors 136 may be positioned on, or may be in communication with, the module 100 to prepare the module 100 for the force(s) $F_1$ that will be applied in anticipation of an encounter with a surface irregularity or obstacle in the road. For example, the suspension member 334 may be stiffened upon the detection of an obstacle by the sensor(s) 136. Additionally, or alternatively, the sensor(s) 136 may relay information to the module 100 regarding the magnitude of the force $F_1$ once applied such that the module 100 can actively generate and apply a counteractive force $F_2$.

It is envisioned that the particular components, geometry, and materials used in construction of the suspension member 334 may be chosen to influence the range of axial motion $R_1$ (FIG. 3) of the actuator 104 to achieve a particular result. For example, a more compliant suspension member 334 may be chosen to permit increased travel and a greater range of axial motion $R_1$, whereas a more rigid suspension member 334 may be chosen to reduce travel and limit the range of axial motion $R_1$.

Figure 5:
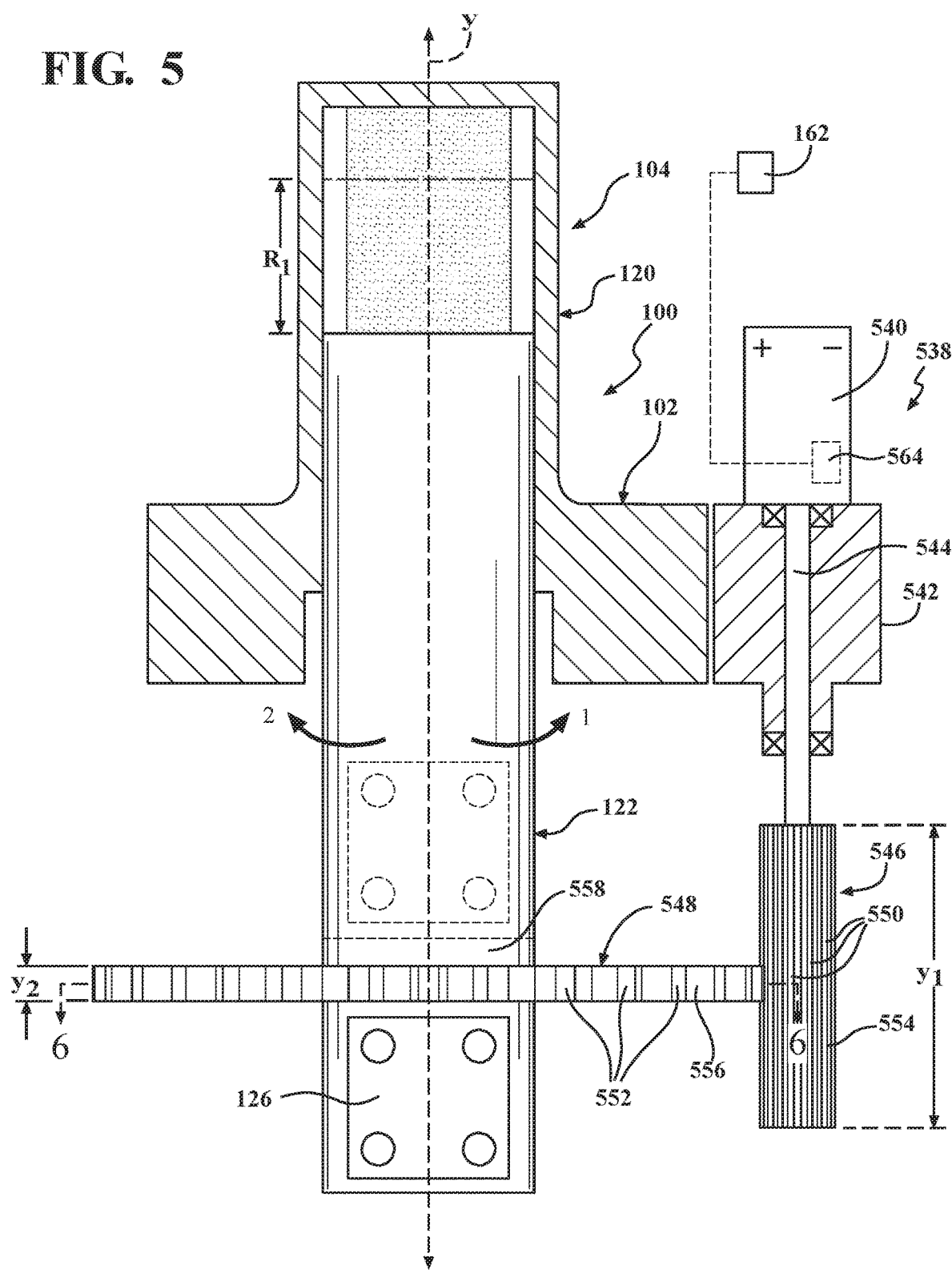
FIG. 5 is a longitudinal, partial cross-sectional view of the first component seen in FIG. 1 shown with the second component and one embodiment of a steering system.

With reference now to FIG. 5, an embodiment of the aforementioned steering system will be discussed, which is identified by the reference character 538. The steering system 538 is connected to the actuator 104 so as to apply a rotational force to the second component 122 in the directions indicated by arrows 1, 2 for transmission to the in-hub motor M (FIG. 1) via the interface 126 to cause corresponding angular displacement of the wheel W in the directions indicated by arrows 3, 4 and, thus, facilitate steering and control of the vehicle V. The steering system 538 includes a motor 540, a steering housing 542, a motor shaft 544, a first gear 546 (e.g., a pinion), and a second gear 548. As seen in FIG. 5, in the illustrated embodiment, each component of the steering system 538 is located externally of the actuator 104.

The motor 540 may include any mechanism suitable for the intended purpose of generating and applying a rotational force sufficient to cause angular displacement of the wheel W (FIG. 1). For example, in one particular embodiment, the motor 540 may be an electric motor driven by a battery, a generator, or other such suitable source of power. Although illustrated as being positioned above the steering housing 542 in the embodiment depicted in FIG. 5, in alternate embodiments, the particular location of the motor 540 may be varied depending upon, for example, the particular geometry of the vehicle V, design tolerances, and spatial allowances.

The steering housing 542 is configured and positioned to support the motor 540 and the motor shaft 544 such that the motor shaft 544 extends between the motor 540 and the first gear 546. The steering housing 542 may be positioned in any suitable location. For example, as illustrated in FIG. 5, the steering housing 542 may be connected to the housing 102 of the module 100. Alternatively, it is envisioned that the steering housing 542 may be connected to the body B (FIG. 1) of the vehicle V.

The first gear 546 is connected to the motor shaft 544 such that rotation of the motor shaft 544 by the motor 540 causes corresponding rotation of the first gear 546. The first gear 546 includes a set of teeth 550, splines, or other such structure that is configured for engagement with a corresponding set of teeth 552, splines, or other such structure included on the second gear 548 such that rotation of the first gear 546 is imparted to the second gear 548. Although respectively illustrated as an elongate, splined shaft 554 and a gear 556 in the embodiment shown in FIG. 5, in alternate embodiments, the gears 546, 548 may be configured in any manner suitable for the intended purpose of transmitting rotational force from the motor 540 to the second component 122.

The second gear 548 is connected to, and extends from, an external surface 558 of the second component 122 such that rotation of the second gear 548 causes corresponding rotation of the second component 122 and, thus, the interface 126. The second gear 548 and the second component 122 may be connected in any suitable manner. For example, in one embodiment, it is envisioned that the second gear 548 and the second component 122 may be integrally or monolithically formed so as to define a unitary structure. Alternatively, it is envisioned that the second gear 548 and the second component 122 may be formed separately and connected via welding or any other suitable method of attachment.

Figure 6:
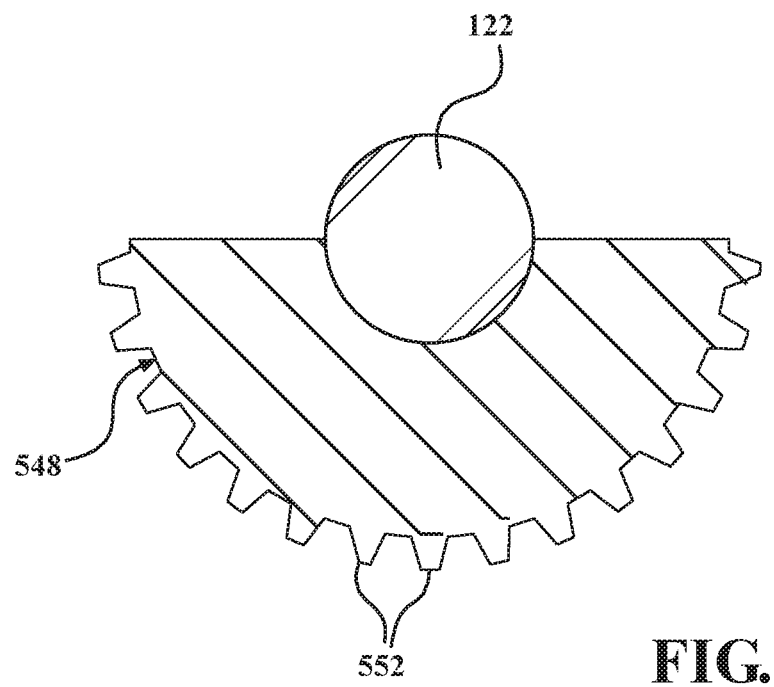
FIG. 6 is a cross-sectional view of the actuator taken along line 6-6 in FIG. 5 together with one embodiment of a gear.
Figure 7:
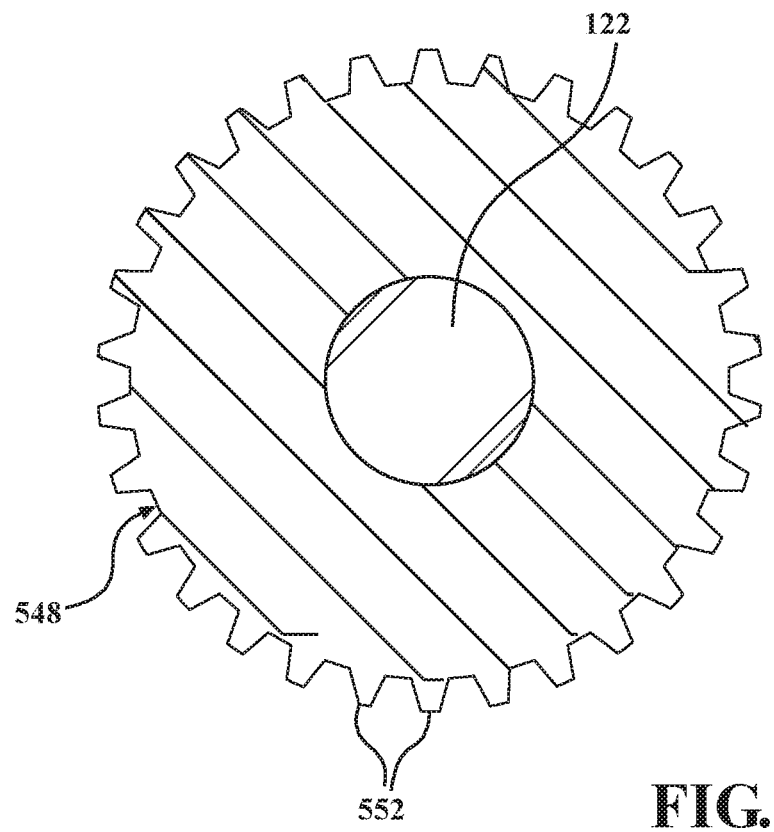
FIG. 7 is a cross-sectional view of the actuator taken along line 6-6 in FIG. 5 together with an alternate embodiment of the gear.

The degree to which the second gear 548 circumscribes the second component 122 may be varied depending upon the desired or intended range of angular motion of the wheel W (FIG. 1). As such, it is envisioned that the second gear 548 may either partially circumscribe the second component 122, for example, such that the second gear 548 extends between approximately 90° and approximately 180° about the second component 122 (FIG. 6), or that the second gear 548 may entirely circumscribe the second component 122 (FIG. 7).

As seen in FIG. 5, the teeth 550 included on the first gear 546 and the teeth 552 included on the second gear 548 are in directional correspondence. In the illustrated embodiment, for example, the teeth 550, 552 are oriented vertically, in generally parallel relation to the longitudinal axis Y of the actuator 104. Correspondence in the orientation of the teeth 550, 552 allows for axial compression and expansion of the actuator 104 without disrupting operation of the steering system 538. More specifically, during compression and expansion of the actuator 104, the teeth 552 included on the second gear 548 are permitted to traverse (i.e., slide along) the outer surface of the first gear 546, thereby preserving engagement of the teeth 550, 552 and allowing for uninterrupted rotation of the gears 546, 548. To further facilitate such operation, the first gear 546 (or the teeth 550) may define an axial dimension $Y_1$ (FIG. 5) that is greater than the range of axial motion $R_1$ for the actuator 104, that is, the axial distance traveled by the second component 122 during compression and expansion of the actuator 104, to maintain engagement of the gears 546, 548. Additionally, or alternatively, it is envisioned that the second gear 548 (or the teeth 552) may define an axial dimension $Y_2$ greater than the range of axial motion $R_1$ for the actuator 104. Thus, embodiments are envisioned in which the axial dimension $Y_1$ may be greater than, less than, or equal to the axial dimension $Y_2$.

With reference again to FIGS. 1-3 and 5, use and operation of the module 100 will be discussed. During operation of the vehicle V, power is supplied to each of the in-hub motors M (FIG. 1) from a main power source 160 (FIG. 1) in the vehicle V to propel the vehicle V. As force(s) $F_1$ are applied to the wheels W, those forces $F_1$ are absorbed by the module 100. Specifically, the forces $F_1$ are communicated from the wheel W to a corresponding actuator 104 via the interface 126, which causes axial compression of the actuator 104 via displacement of the second component 122 (FIG. 3) in relation to the first component 120 along the longitudinal axis Y. As the actuator 104 is compressed, the second component 122 moves axially within the chamber 332 (FIG. 3), through the range of motion $R_1$, to thereby absorb the force(s) $F_1$, for example, via the suspension member 334, and reduce communication of the force(s) $F_1$ to the body B of the vehicle V.

To steer the vehicle V, power is supplied to the motor 540 (FIG. 5) of the steering system 538 to rotate the motor shaft 544 and, thus, the first gear 546. Via engagement of the teeth 550, 552, rotation of the first gear 546 causes rotation of the second gear 548 and, thus, corresponding rotation of the second component 122 and angular displacement (rotation) of the interface 126. As the interface 126 rotates, rotational force is communicated to the in-hub motor M (FIG. 1) to cause corresponding angular displacement of the wheel W in the directions indicated by arrows 3, 4 and permit directional changes in the vehicle V.

In certain embodiments, it is envisioned that the steering system 538 may be manually controlled, for example, by an occupant of the vehicle V. Alternatively, in the context of autonomous vehicles, control over the steering system 538 may be relegated to the vehicle V itself, for example, to a central processor 162 (FIGS. 1, 5) in directional communication with the steering system 538. In such embodiments, conditions may be monitored by one or more sensors 564 (FIG. 5), for example, to monitor speed, acceleration, the angular position of the wheels W, force, etc., which may be positioned in any location permitting communication with the central processor 162 to inform control of the vehicle V. For example, as shown in FIG. 5, the sensor(s) 564 may be positioned on the steering system 538. During autonomous function, the central processor 162 may communicate control signals to the steering system 538 to govern operation of the motor 540 and, thus, steering of the vehicle V.

Figure 8:
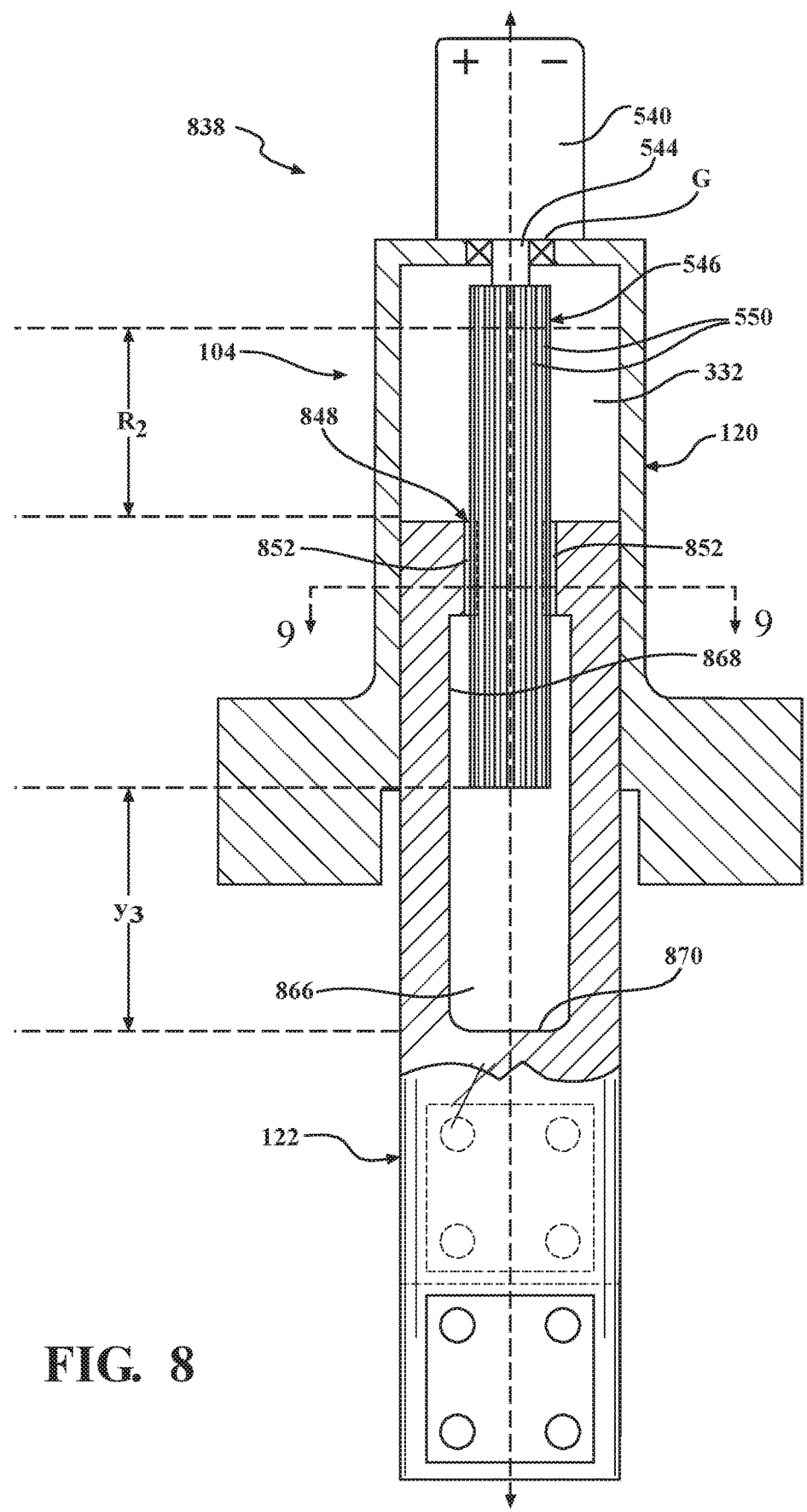
FIG. 8 is a longitudinal, partial cross-sectional view of the module seen in FIG. 1 together with an alternate embodiment of the steering system.

FIG. 8 illustrates an alternate embodiment of the steering system, which is identified by the reference character 838. The steering system 838 includes the aforementioned motor 540, motor shaft 544, and first gear 546, and is substantially similar in both structure and operation to the steering system 538 discussed above with respect to FIG. 5. Accordingly, in the interest of brevity, the steering system 838 will only be discussed with respect to any differences from the steering system 538.

In contrast to the steering system 538, in the steering system 838, the motor shaft 544 and the first gear 546 are each positioned internally within the actuator 104. More specifically, the motor shaft 544 and the first gear 546 are positioned within an internal cavity 866 defined by the second component 122. The first gear 546 is configured and positioned for engagement with a gear 848, which is substantially similar in both structure and function to the second gear 548 (FIG. 5) discussed above. The gear 848 is secured to an inner wall 868 defining the cavity 866 such that the gear 848 extends inwardly into engagement with the first gear 546, whereby rotation of the first gear 546 is imparted to the gear 848 and, thus, the second component 122.

Figure 9A:
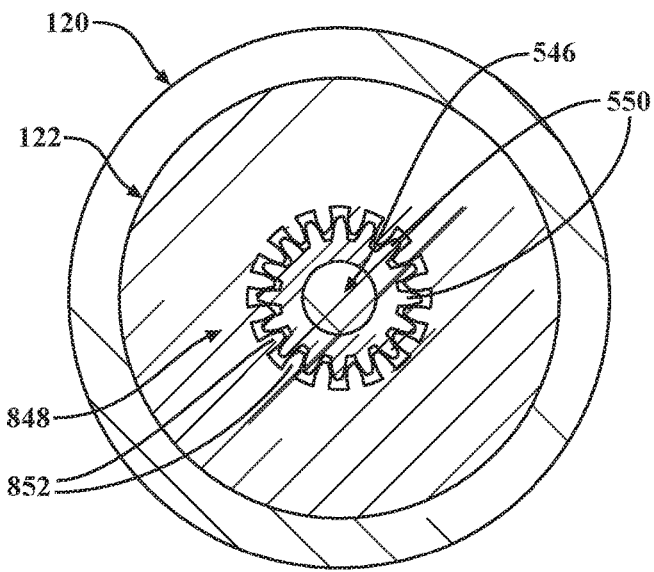
FIG. 9A is a cross-sectional view taken along line 9-9 in FIG. 8.
Figure 9B:
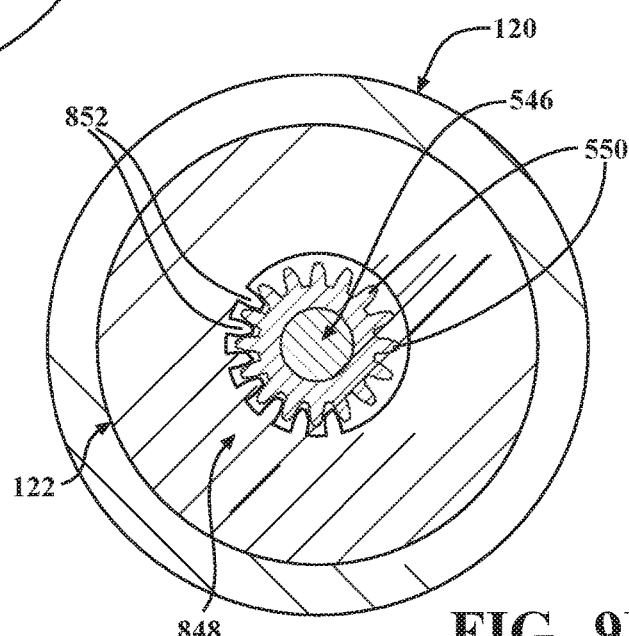
FIG. 9B is a cross-sectional view taken along line 9-9 in FIG. 8 according to an alternate embodiment of the disclosure.

As seen in FIGS. 8 and 9A, in one embodiment, it is envisioned that the gear 848 may include an annular configuration such that the gear 848 completely circumscribes the first gear 546. Alternatively, as seen in FIG. 9B, the second component 122 may include one or more crescent-shaped gears (or gear tracks) 848 that partially circumscribe the first gear 546.

It is envisioned that the gear 848 and the second component 122 may be connected in any suitable manner. For example, the gear 848 and the second component 122 may be integrally or monolithically formed so as to define a unitary structure. Alternatively, the gear 848 and the second component 122 may be formed separately and connected via welding or any other suitable method of attachment.

Figure 9C:
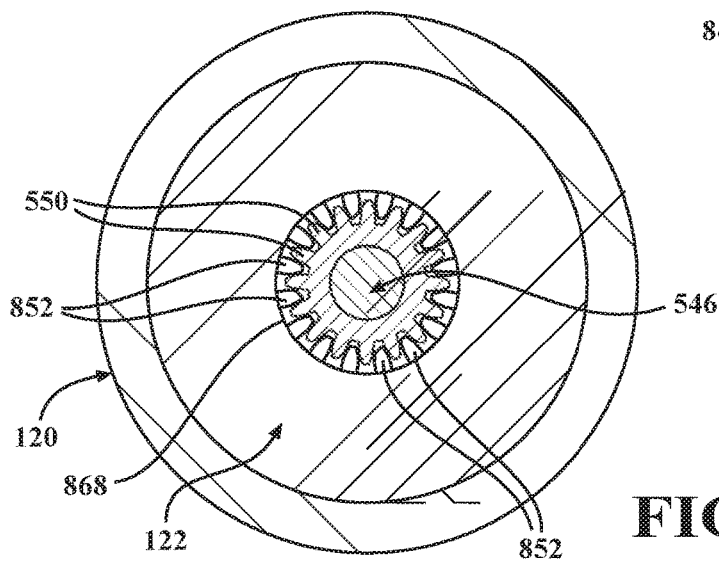
FIG. 9C is a cross-sectional view taken along line 9-9 in FIG. 8 according to an alternate embodiment of the disclosure.

FIG. 9C illustrates an alternate embodiment of the disclosure devoid of the aforementioned gear 848 in which the second component 122 includes a series of integral teeth 852 that extend inwardly from the inner wall 868 defining the cavity 866 and into engagement with the teeth 550 included on the first gear 546.

As can be appreciated through reference to FIG. 8, each component of the steering system 838 is in axial alignment. By aligning the components of the steering system 838, stiffness of the steering system 838 may be increased, for example, relative to the steering system 538 (FIG. 5), in which the gears 546, 548 are axially offset.

Additionally, it is envisioned that by enclosing the gears 546, 848 and the motor shaft 544 within the actuator 104, the actuator 104 may insulate the gears 546, 848 and the motor shaft 544 from dust and other such debris. To further facilitate such insulation, the actuator 104 may include one or more gaskets G (FIG. 8), seals, etc.

Figure 10:
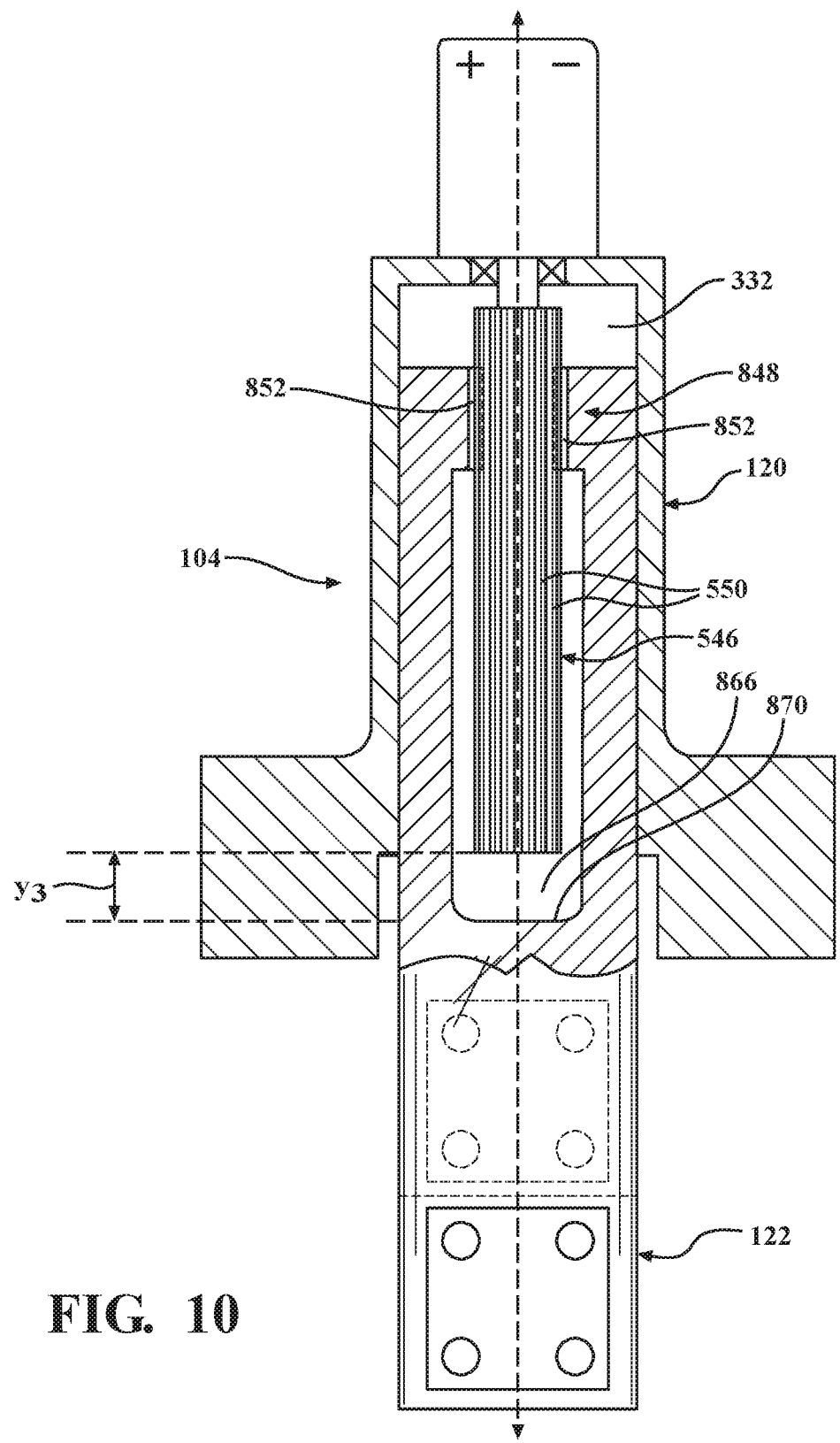
FIG. 10 is a longitudinal, partial cross-sectional view of the module seen in FIG. 1 together with an alternate embodiment of the steering system.

During operation of the vehicle V and axial compression of the actuator 104, as discussed above, the second component 122 is displaced in relation to the first component 120 and moves (vertically) through the chamber 332. As can be appreciated through reference to FIGS. 8 and 10, the chamber 332 accommodates vertical displacement of the second component 122 by allowing the second component 122 to move about the first gear 546, whereby a distance $Y_3$ defined between the first gear 546 and an end wall 870 of the cavity 866 is reduced. As discussed above in connection with the steering system 538 (FIG. 5), the corresponding (vertical) orientations of the teeth 550, 852 respectively included on the gears 546, 848 allow for axial compression and expansion of the actuator 104 without disrupting rotation of the gears 546, 848 and operation of the steering system 838. To facilitate such operation, the distance $Y_3$ defined between the first gear 546 and the end wall 870 of the cavity 866 is greater than the range of axial motion $R_1$ (FIG. 8), that is, the axial distance traveled by the second component 122 during compression and expansion of the actuator 104, to maintain engagement of the gears 546, 848.

Figure 11:
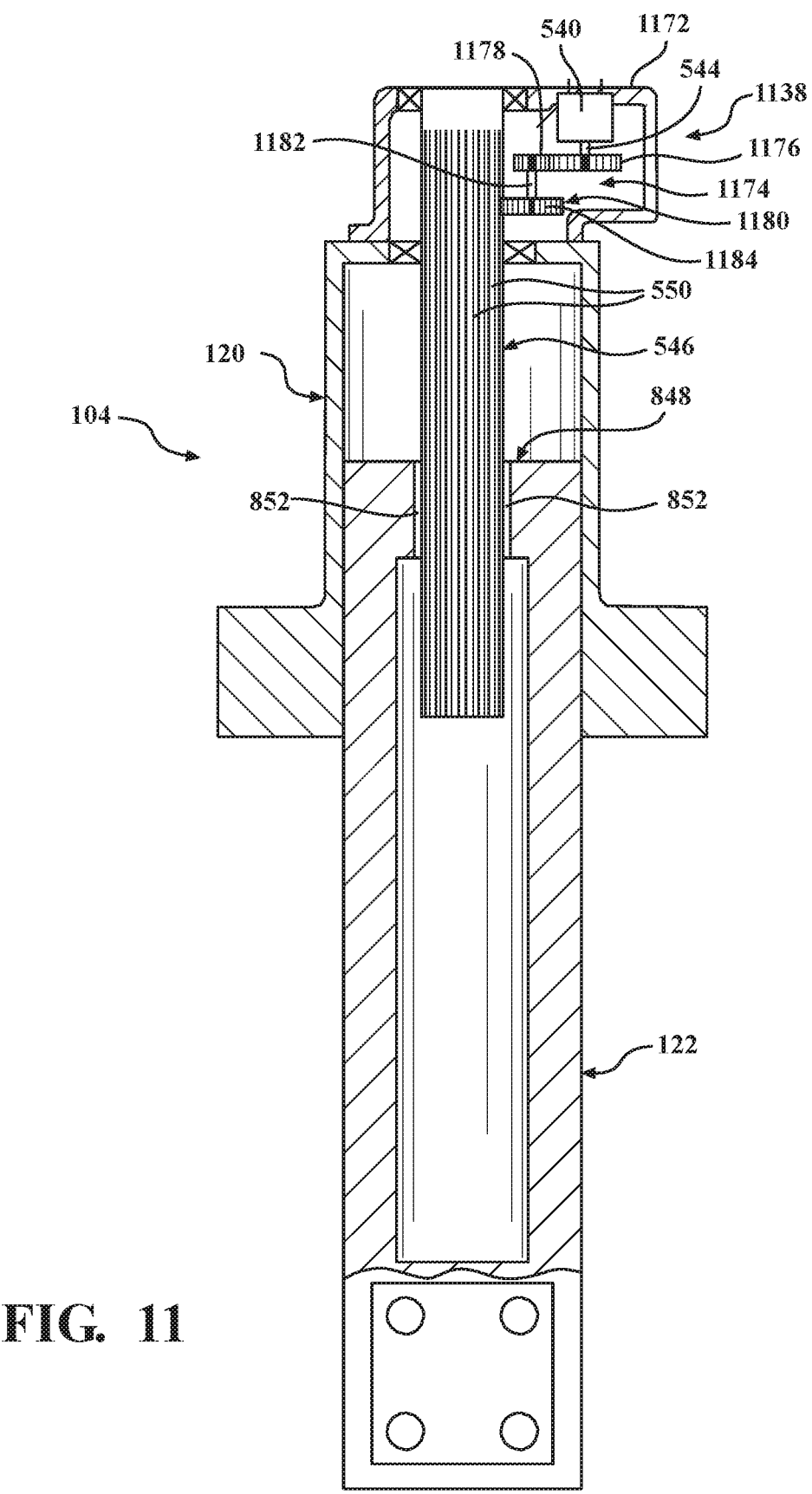
FIG. 11 is a longitudinal, partial cross-sectional view of the module seen in FIG. 1 together with an alternate embodiment of the steering system.

FIG. 11 illustrates another embodiment of the steering system, which is identified by the reference character 1138. The steering system 1138 includes the aforementioned motor 540, motor shaft 544, and gears 546, 848, and is substantially similar in both structure and operation to the steering system 838 discussed above with respect to FIGS. 8 and 10. Accordingly, in the interest of brevity, the steering system 1138 will only be discussed with respect to any differences from the steering system 838.

The steering system 1138 further includes a steering housing 1172 and a gear assembly 1174 that communicates rotational motion from the motor 540 to the gears 546, 848. The gear assembly 1174 includes respective first, second, and third gears 1176, 1178, 1180 that are connected by the motor shaft 544 and a drive shaft 1182. More specifically, the first gear 1176 is connected to the motor shaft 544 such that rotation of the motor shaft 544 causes corresponding rotation of the first gear 1176. The respective first and second gears 1176, 1178 are in engagement such that rotation of the first gear 1176 causes rotation of the second gear 1178, which causes rotation of the third gear 1180 via the drive shaft 1182. The third gear 1180 includes a series of teeth 1184 that are configured in correspondence with the teeth 550 included on the first gear 546 such that rotation of the third gear 1180 causes rotation of the first gear 546. As discussed above with respect to FIG. 8, rotation of the first gear 546 causes corresponding rotation of the gear 848 (secured to the inner wall 868 defining the cavity 866) to thereby rotate the second component 122.

As discussed in connection with the preceding embodiments, the teeth 1184 included on the third gear 1180 are oriented in correspondence with the teeth 550 included on the first gear 546 and the teeth 852 included on the gear 848, which allows for vertical displacement of the second component 122 in relation to the first component 120 without disrupting operation of the steering system 1138.

With reference again to FIG. 1, as discussed above, during operation of the vehicle V, power is supplied to the in-hub motors M from the power source 160 of the vehicle V. In one embodiment, it is envisioned that power may be delivered to the in-hub motors M by a cable 186. In such embodiments, the cable 186 and the components thereof may be provided with sufficient slack to permit both rotation and vertical travel of the wheels W. In various implementations, it is envisioned that the cable 186 may be routed either through or around the module 100 and/or the interface 126.

In one particular embodiment, in addition to the cable 186, or instead of the cable 186, power may be supplied to the in-hub motors M (FIG. 1) using a power supply system 1288 (FIGS. 12, 13) that is routed through and incorporated into the modules 100. While the power supply system 1288 is shown and described in connection with the actuator 104 and the steering system 1138, the components and principles of operation of the power supply system 1288 may be employed in connection with any of the embodiments of the disclosure discussed herein.

The power supply system 1288 includes a first bus bar 1290, a second bus bar 1292 positioned coaxially about the first bus bar 1290, and insulators 1294, 1296. The insulator 1294 separates the bus bars 1290, 1292 from electrical contact and the insulator 1296 insulates the second bus bar 1292 from electrical contact with the first gear 546. The power supply system 1288 extends through the actuator 104 such that the power supply system 1288 is allowed to remain stationary in relation to the module 100 during operation. More specifically, during operation of the module 100, the second component 122 and the gears 546, 848 are displaced both axially and rotationally in relation to the bus bars 1290, 1292.

The power supply system 1288 further includes third and fourth bus bars 1298, 1300, respectively, that are embedded within the second component 122, as well as brushes 1302, 1304 that are configured and positioned for electrical contact with the bus bars 1290, 1292 and the bus bars 1298, 1300. More specifically, the brush 1302 is in electrical contact with the bus bars 1292, 1298 and the brush 1304 is in electrical contact with the bus bars 1290, 1300.

The bus bars 1290, 1292, 1298, 1300 and the brushes 1302, 1304 may include (e.g., may be formed from) any material suitable for the intended purpose of communicating electrical power. For example, in one particular embodiment, the bus bars 1290, 1292, 1298, 1300 and the brushes 1302, 1304 may include (e.g., may be formed from) copper or any other suitable electrically conductive material.

During operation of the vehicle V, electrical power is communicated from the power source 160 (FIG. 1) of the vehicle V, through the power supply system 1288 (FIG. 12) and the modules 100, to the in-hub motors M. More specifically, power is communicated from the power source 160, through the bus bars 1290, 1292, to the brushes 1302, 1304. The electrical contact established between the brush 1302 and the bus bars 1292, 1298 and between the brush 1304 and the bus bars 1290, 1300 allows power to be communicated from the bus bars 1290, 1292, through the brushes 1302, 1304, to the bus bars 1298, 1300 and, ultimately, to the in-hub motors M (FIG. 1) without disrupting rotation of the second component 122.

Figure 14:
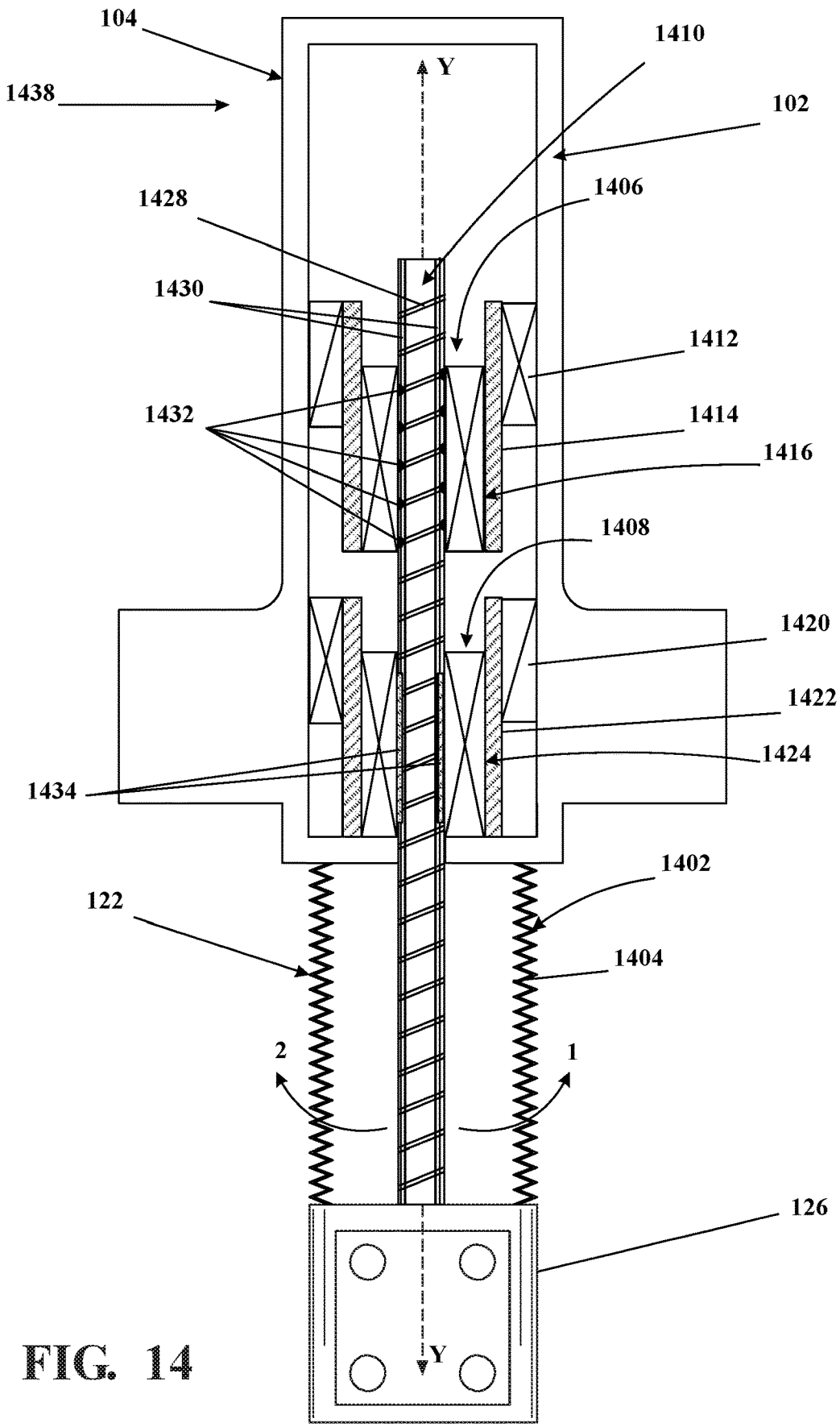
FIG. 14 is a longitudinal, partial cross-sectional view of an alternate embodiment of the module seen in FIG. 1.

FIG. 14 is a longitudinal, partial cross-sectional view of a module 1400, which is an alternate embodiment of the module 100 of FIG. 1. The module 1400 is substantially similar in both structure and operation to the module 100 and will only be discussed with respect to any differences therefrom in the interest of brevity.

The module 1400 includes the actuator 104 and is configured to provide both suspension and steering functionality by causing axial and rotational movement of the second component 122 in relation to the first component 120 in the manner described herein below. More specifically, as discussed in connection with the module 100, the module 1400 causes axial movement of the second component 122 along the longitudinal axis Y of the actuator 104 (active suspension functionality) and rotational movement of the second component 122 in the directions indicated by arrows 1, 2 (FIG. 14) (steering functionality) to cause corresponding angular displacement of the wheel W (FIG. 1) in the direction indicated by arrows 3, 4 via the interface 126. In the illustrated embodiment, the second component 122 is shown as including a compressible section 1402 to accommodate axial movement of the second component 122 in relation to the first component 120. The compressible section 1402 may include a bellows 1404 that encloses other components and is able to compress and expand. The compressible section 1402 may also include passive suspension components such as a coil spring or a pneumatic spring.

The module 1400 includes a first drive assembly 1406 and a second drive assembly 1408 and a drive screw 1410. In the illustrated example, the first drive assembly 1406 and the second drive assembly 1408 are spaced axially from each other and are arranged around the drive screw 1410. The first drive assembly 1406 and the second drive assembly 1408 are mechanisms that are configured to cause axial and rotational movement of the second component 122 via the drive screw 1410 in the manner described herein. In the illustrated example, the first drive assembly 1406 and the second drive assembly 1408 each include electric motors that cause motion of the drive screw 1410 using electrical power provided from a power source, such as a battery.

The first drive assembly 1406 includes a first stator 1412 and a first rotor 1414, and a ball screw nut 1416. The first stator 1412 and the first rotor 1414 define a first electric motor, which can be constructed according to many suitable well-known designs. The first stator 1412 is fixedly connected to the actuator 104 (e.g., to the first component 120) and the first rotor 1414 is rotatable in relation to the first stator 1412 in response to interaction of electromagnetic forces between the first stator 1412 and the first rotor 1414. The first rotor 1414 is connected to the ball screw nut 1416 such that rotation of the first rotor 1414 causes corresponding rotation of the ball screw nut 1416.

The ball screw nut 1416 is conventional in design. For example, the ball screw nut 1416 may include a helical bearing race in which ball bearings 1432 are located for engagement with the drive screw 1410, and recirculating passages for circulating the ball bearings 1432 through the helical bearing race.

In the illustrated example, the first rotor 1414 is connected directly to the ball screw nut 1416. In alternative implementations, the first rotor 1414 may be connected to the ball screw nut 1416 by intervening components, such as a gear train.

In the illustrated example, the first stator 1412 and the first rotor 1414 define the first electric motor such that it is arranged around the drive screw 1410, for example, with an axis of rotation of the first rotor 1414 being coincident with the longitudinal axis of the drive screw 1410. In alternative implementations, the first electric motor may be configured differently relative to the drive screw 1410, such as in an off-axis configuration in which the first electric motor is positioned outside of the housing 102 and the first electric motor and is connected to the ball screw nut 1416 by a gear train or other suitable structure.

The second drive assembly 1408 includes a second stator 1420 and a second rotor 1422, and a ball spline nut 1424. The second stator 1420 and the second rotor 1422 define a second electric motor, which can be constructed according to many suitable well-known designs. The second stator 1420 is fixedly connected to the actuator 104 (e.g., to the first component 120) and the second rotor 1422 is rotatable in relation to the second stator 1420 in response to interaction of electromagnetic forces between the second stator 1420 and the second rotor 1422. The second rotor 1422 is connected to the ball spline nut 1424 such that rotation of the second rotor 1422 causes corresponding rotation of the ball spline nut 1424.

The ball spline nut 1424 is conventional in design. For example, the ball spline nut 1424 may include axial bearing races that are arrayed around an axial passage through which the drive screw 1410 is received. Ball bearings 1434 are located in the axial bearing races for engagement with the drive screw 1410, and the ball spline nut includes recirculating passages for circulating the ball bearings 1434 through the axial bearing races.

In the illustrated example, the second rotor 1422 is connected directly to the ball spline nut 1424. In alternative implementations, the second rotor 1422 may be connected to the ball spline nut 1424 by intervening components, such as a gear train.

In the illustrated example, the second stator 1420 and the second rotor 1422 define the second electric motor such that it is arranged around the drive screw 1410, for example, with an axis of rotation of the second rotor 1422 being coincident with the longitudinal axis of the drive screw 1410. In alternative implementations, the second electric motor may be configured differently relative to the drive screw 1410, such as in an off-axis configuration in which the second electric motor is positioned outside of the housing 102 and the second electric motor and is connected to the ball spline nut 1424 by a gear train or other suitable structure.

The drive screw 1410 is an elongate, generally cylindrical structure that includes a helical groove 1428 (i.e., a screw thread) and axial grooves 1430 that are arrayed around the periphery of the drive screw 1410 and extend in the axial direction of the drive screw 1410 (e.g., in parallel relation to the longitudinal axis Y of the actuator 104). As will be explained further herein, the first drive assembly 1406 is configured for engagement with the helical groove 1428 of the drive screw 1410 and the second drive assembly 1408 is configured for engagement with the axial grooves 1430 of the drive screw 1410. The drive screw 1410 extends axially through the actuator 104 and is secured to the interface 126 such that axial and rotational movement of the drive screw 1410 causes corresponding axial and rotational movement of the interface 126.

The helical groove 1428 is configured for engagement with the ball screw nut 1416 such that relative rotation of the ball screw nut 1416 relative to the drive screw 1410 causes axial movement of drive screw to move the second component 122 along the longitudinal axis Y (i.e., vertically upward and downward movement of the second component 122).

The axial grooves 1430 are configured for engagement with the ball bearings 1434 of the ball spline nut 1424 to prevent relative rotation between the ball spline nut 1424 and the drive screw 1410 and, thus, to prevent relative rotation between the ball spline nut 1424 and the second component 122. At the same time, drive screw 1410 is able to move axially relative to the ball spline nut 1424, as the ball bearings 1434 slide along the axial grooves 1430. As discussed in further detail below, preventing relative rotation between the ball spline nut 1424 and the drive screw 1410 allows the rotational position of the drive screw 1410 to be controlled via the application of force by the second rotor 1422.

Upon actuation of the first drive assembly 1406, the ball screw nut 1416 may be caused to rotate either in a first direction of rotation or in a second direction of rotation that is opposite the first direction. As the ball screw nut 1416 is rotated in the first direction (e.g., clockwise), the drive screw 1410 and, thus, the second component 122, may be moved vertically upward (i.e., towards the first component 120) via engagement between the bearings 1432 of the ball screw nut 1416 and the helical groove 1428. As the ball screw nut 1416 is rotated in the second direction (e.g., counterclockwise), the drive screw 1410 and, thus, the second component 122, may be moved vertically downward (i.e., away from the first component 120).

It is envisioned that the orientation and/or pitch of the helical groove 1428 may be varied in alternate embodiments of the disclosure (e.g., depending upon the particular configuration and/or power of the drive assemblies 1406, 1408 and/or the motors used therein) to achieve any desired result. For example, in certain embodiments, the orientation of the helical groove 1428 may be reversed such that rotation of the ball screw nut 1416 in the first direction causes downward movement of the second component 122 (i.e., away from the first component 120) and rotation of the ball screw nut 1416 in the second direction causes upward movement of the second component 122 (i.e., towards the first component 120). Additionally, or alternatively, the pitch of the helical groove 1428 may be increased or decreased to cause increased or decreased vertical travel of the drive screw 1410 for a given degree of relative rotation between the ball screw nut 1416 and the drive screw 1410.

Upon actuation of the second drive assembly 1408, a force is applied to the ball spline nut 1424 by the second rotor 1422 to control and/or vary the rotational position of the drive screw 1410 and, thus, the second component 122. For example, the force applied to the ball spline nut 1424 may be sufficient to maintain the rotational positions of the ball spline nut 1424 and the second component 122 (e.g., the second drive assembly 1408 may be used to apply a rotational force to the drive screw 1410 to counteract an opposing rotational force). Alternatively, the force applied to the ball spline nut 1424 may be sufficient to cause rotation of the ball spline nut 1424, the drive screw 1410, and the second component 122, and consequently, rotation of the interface 126 and the wheel W (FIG. 1) in the manner discussed above.

With continued reference to FIG. 14, operation of the module 1400 will be discussed. By varying the speed of the drive assemblies 1406, 1408, the relative rotational positions of the ball screw nut 1416 and the ball spline nut 1424 and the drive screw 1410 can also be varied. For example, rotating the ball screw nut 1416 and the ball spline nut 1424 at equivalent speeds (i.e., such that there is no relative rotation between the ball screw nut 1416 and the drive screw 1410) causes corresponding rotation of the drive screw 1410 via engagement between the ball spline nut 1424 and the axial grooves 1430 such that the ball screw nut 1416, the ball spline nut 1424, and the drive screw 1410 are rotated in unison. The absence of relative rotation between the ball screw nut 1416 and the drive screw 1410 allows for rotation of the second component 122 via the interface 126 without any resultant change in the axial position of the drive screw 1410 or the second component 122. Operating the drive assemblies 1406, 1408 such that the ball screw nut 1416 and the ball spline nut 1424 are rotated at equivalent speeds thus results in pure steering functionality.

By varying the speed of the drive assemblies 1406, 1408, however, relative rotation between the ball screw nut 1416 and the ball spline nut 1424 and, thus, relative rotation between the ball screw nut 1416 and the drive screw 1410, can be realized to thereby control the axial position of the second component 122 thereby apply active suspension forces. More specifically, by maintaining the rotational position of the ball spline nut 1424 during rotation of the ball screw nut 1416 (i.e., via the application of force by the second rotor 1422 or by another locking mechanism), the rotational position of the drive screw 1410 can be preserved. Consequently, as the ball screw nut 1416 rotates in relation to the drive screw 1410, the bearings 1432 are moved through the helical groove 1428 to thereby shift the drive screw 1410 and the second component 122 axially, the direction of which is dependent upon the direction of rotation of the ball screw nut 1416. Since the rotational position of the drive screw 1410 is maintained via the force applied to the ball spline nut 1424 by the second rotor 1422, axial movement of the drive screw 1410 and the second component 122 can be achieved without any rotation of the second component 122, thus resulting in pure suspension functionality.

To achieve both steering and suspension functionality, the ball spline nut 1424 is caused to rotate while the ball screw nut 1416 remains stationary such that rotational movement is imparted to the second component 122 via the drive screw 1410. More specifically, rotation of the ball spline nut 1424 causes corresponding rotation of the drive screw 1410 via engagement between ball bearings 1434 and the axial grooves 1430 and, thus, the second component 122, the interface 126, and the wheel W (FIG. 1) to thereby steer the vehicle V. In addition, as a result of the relative rotation between the drive screw 1410 and the (stationary) ball screw nut 1416, the bearings 1432 are moved through the helical groove 1428 to thereby shift the drive screw 1410 and the second component 122 axially, as discussed above, creating suspension functionality as well.

To manage and/or absorb forces applied to the actuator 104 during use of the vehicle V (FIG. 1) (e.g., via encounter with a surface irregularity or an obstacle in the road), the direction of rotation of the ball spline nut 1424 can be varied to move the second component 122 upwards or downwards as needed. More specifically, depending upon the particular orientation of the helical groove 1428, rotating the ball spline nut 1424 in a first direction (e.g., clockwise) will cause upward movement of the second component 122 whereas rotating the ball spline nut 1424 in a second direction opposite the first direction (e.g., counterclockwise) will cause downward movement of the second component 122.

Although shown as being positioned concentrically about the drive screw 1410, the ball screw nut 1416, and the ball spline nut 1424 in the embodiment seen in FIG. 14, the location of the stators 1412, 1420 and/or the rotors 1414, 1422 may be varied in alternate embodiments of the disclosure. For example, depending upon the particular geometry of the vehicle V (FIG. 1), design tolerances, and/or spatial allowances, it is envisioned that the stators 1412, 1420 and/or the rotors 1414, 1422 may be located remotely from the ball screw nut 1416 and the ball spline nut 1424 and connected thereto via a belt, chain, gear train, or other such suitable structure or mechanism.

Additionally, although the drive assemblies 1406, 1408 are shown as being identical in the embodiment seen in FIG. 14, but for differences in the ball screw nut 1416 as compared to the ball spline nut 1424, in various embodiments of the disclosure, it is envisioned that the drive assemblies 1406, 1408 may be dissimilar. For example, due to the increased force required to control suspension of the vehicle V (FIG. 1) as compared to steering of the vehicle V, the second drive assembly 1408 may be smaller, less powerful, and/or operable at a lower bandwidth than the first drive assembly 1406 (e.g., the first drive assembly 1406 may be rated at 50 Hz to 100 Hz whereas the second drive assembly 1408 may be rated at 5 Hz to 10 Hz).

Persons skilled in the art will understand that the various embodiments of the disclosure described herein and shown in the accompanying figures constitute non-limiting examples. Additionally, persons skilled in the art will understand that the elements and features shown or described in connection with one embodiment may be combined with those of another embodiment without departing from the scope of the present disclosure.

In the preceding description, reference may be made to the spatial relationship between the various structures illustrated in the accompanying drawings and to the spatial orientations of the structures. However, as will be recognized by those skilled in the art after a complete reading of this disclosure, the structures described herein may be positioned and oriented in any manner suitable for their intended purpose. Thus, the use of terms such as "above," "below," "upper," "lower," "inner," "outer," etc., should be understood to describe a relative relationship between structures and/or a spatial orientation of the structures.

The use of terms such as "approximately" and "generally" should be understood to allow for variations in any numerical range or concept with which they are associated. For example, it is envisioned that the use of terms such as "approximately" and "generally" should be understood to encompass variations on the order of 25%, or to allow for manufacturing tolerances and/or deviations in design.

The present technology may be implemented in the context of systems that gather and use data available from various sources to improve control of vehicle actuator systems, for example, by customizing control of vehicle actuator systems based on user preferences that are stored in a profile that is associated with a user. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to identify a person who is present in a vehicle and change comfort-related settings based on information from a stored profile. Further, other uses for personal information data that benefit the user are also contemplated by the present disclosure.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In another example, users can limit the types of uses of personal information or may limit the time period over which such information is stored and available for use. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

What is claimed is:

1. A combined suspension and steering module positionable between an in-hub motor and a body of a vehicle, the combined suspension and steering module comprising:
    a housing;
    an actuator connected to the housing and including first and second components, the second component being axially movable in relation to the first component; and
    a steering system in mechanical cooperation with the actuator to rotate at least one of the first and second components in relation to the housing, the second component being configured for connection to the in-hub motor to transmit rotational force from the actuator to the in-hub motor to cause angular displacement of the in-hub motor to thereby steer the vehicle, the steering system comprising:
        a motor,
        a motor shaft connected to the motor,
        a first gear connected to the motor shaft, and
        a second gear rotatably connected to the second component of the actuator, the second gear being engageable with the first gear such that rotation of the motor shaft causes corresponding rotation of the first gear and the second gear.

2. The combined suspension and steering module of claim 1, wherein the actuator includes a suspension member positioned between the first and second components to absorb axial force applied to the actuator.

3. The combined suspension and steering module of claim 1, wherein the first gear and the second gear are positioned externally of the actuator.

4. The combined suspension and steering module of claim 1, wherein the first gear and the second gear are positioned internally within the actuator.

5. The combined suspension and steering module of claim 4, wherein the second gear is positioned about the first gear such that the second gear at least partially circumscribes the first gear.

6. The combined suspension and steering module of claim 1, further including a power supply system extending through the actuator and configured to supply power to the in-hub motor.

7. The combined suspension and steering module of claim 6, wherein the power supply system includes a pair of bus bars, with one of the pair of bus bars fixed relative to the first component and the other one of the pair of bus bars movable axially and rotatably with the second component, with the pair of bus bars configured to transmit electricity between each other to or from the in-hub motor.

8. The combined suspension and steering module of claim 7, wherein the power supply system further includes a brush fixed to one of the pair of bus bars and in contact with and slidable along the other one of the pair of bus bars to transmit electricity between the pair of bus bars as the second component moves axially and rotatably relative to the first component.

9. A combined suspension and steering module for use with a vehicle including an in-hub motor, the combined suspension and steering module comprising:
   an actuator including a first component and a second component operatively connected to the first component the second component being axially movable in relation to the first component whereby the actuator is repositionable between a first position, in which the actuator defines a first overall length, and a second position, in which the actuator defines a second overall length less than the first overall length; and
   a steering system in mechanical cooperation with the second component of the actuator such that the second component is rotatable by the steering system in relation to the first component, the steering system comprising:
      a first gear; and
      a second gear operatively connected to the second component, the second gear being engageable with the first gear such that rotation of the first gear causes corresponding rotation of the second gear and the second component,
      wherein the first gear and the second gear are positioned internally within the actuator.

10. The combined suspension and steering module of claim 9, wherein the first component defines an internal chamber configured to receive the second component such that the second component is axially movable within the internal chamber.

11. The combined suspension and steering module of claim 10, wherein the actuator further includes a suspension member positioned within the internal chamber to absorb axial force applied to the actuator.

12. The combined suspension and steering module of claim 11, wherein the actuator is biased towards the first position by the suspension member.

13. The combined suspension and steering module of claim 9, wherein the actuator includes an interface configured for connection to the in-hub motor to transmit rotational force to the in-hub motor.

14. The combined suspension and steering module of claim 13, wherein the steering system is in mechanical cooperation with the first component of the actuator to cause rotation of the first component, the second component including the interface and being connected to the first component such that the second component is rotatable in unison with the first component.

15. The combined suspension and steering module of claim 13, wherein the interface is connected to the second component.

16. The combined suspension and steering module of claim 15, wherein the steering system further comprises a motor, with the first gear operatively connected to the motor.

17. A combined suspension and steering module for use with a vehicle, the combined suspension and steering module comprising:
   a housing connectable to a body of the vehicle;
   an actuator secured to the housing, the actuator comprising:
      an outer component, and
      an inner component operatively connected to the outer component such that the inner component is axially movable in relation to the outer component; and
   a steering system in mechanical cooperation with the actuator to cause rotation of the inner component, the inner component including an interface connectable to an in-hub motor of the vehicle to transmit rotation of the inner component to the in-hub motor, the steering system comprising:
      a motor,
      a motor shaft connected to the motor,
      a first gear connected to the motor shaft, and
      a second gear connected to the inner component, the second gear being engageable with the first gear such that rotation of the motor shaft causes corresponding rotation of the first gear and the second gear to thereby rotate the inner component of the actuator relative to the outer component of the actuator and cause angular displacement of the in-hub motor to steer the vehicle.

18. The combined suspension and steering module of claim 17, wherein axial movement of the inner component in relation to the outer component repositions the actuator between a first position, wherein the actuator defines a first overall length, and a second position, wherein the actuator defines a second overall length less than the first overall length.

19. The combined suspension and steering module of claim 17, wherein the actuator further includes a suspension member positioned between the inner component and the outer component to absorb axial force applied to the actuator.

20. The combined suspension and steering module of claim 17, wherein the first gear and the second gear are positioned internally within the actuator.

* * * * *